(12) United States Patent
Kim et al.

(10) Patent No.: US 12,106,891 B2
(45) Date of Patent: Oct. 1, 2024

(54) DISPLAY APPARATUS

(71) Applicant: SAMSUNG ELECTRONICS CO., LTD., Suwon-si (KR)

(72) Inventors: Moonyoung Kim, Suwon-si (KR); Jeongil Kang, Suwon-si (KR); Jaesung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/942,788

(22) Filed: Sep. 12, 2022

(65) Prior Publication Data

US 2023/0005661 A1    Jan. 5, 2023

Related U.S. Application Data

(63) Continuation of application No. PCT/KR2021/001894, filed on Feb. 15, 2021.

(51) Int. Cl.
| | |
|---|---|
| H01F 38/14 | (2006.01) |
| G09G 3/20 | (2006.01) |
| H01F 27/24 | (2006.01) |
| H01F 27/34 | (2006.01) |
| H02J 50/10 | (2016.01) |
| H02J 50/90 | (2016.01) |
| G09G 3/32 | (2016.01) |
| H02M 1/42 | (2007.01) |

(52) U.S. Cl.
CPC ........... *H01F 38/14* (2013.01); *G09G 3/2092* (2013.01); *H01F 27/24* (2013.01); *H01F 27/346* (2013.01); *H02J 50/10* (2016.02); *H02J 50/90* (2016.02); *G09G 3/32* (2013.01); *H02M 1/4208* (2013.01)

(58) Field of Classification Search
CPC .......... H04W 8/24; H01F 38/14; H01F 27/24; H01F 27/346; H02J 50/10; H02J 50/90; G09G 3/2092; G09G 3/32; H02M 1/4208
See application file for complete search history.

(56) References Cited

U.S. PATENT DOCUMENTS

| | | | | |
|---|---|---|---|---|
| 5,455,467 | A | * | 10/1995 | Young .................. G06F 1/26 307/104 |
| 9,544,951 | B1 | * | 1/2017 | O'Neil ................. H05B 45/382 |
| 10,333,296 | B1 | * | 6/2019 | Wu .......................... A61B 34/30 |

(Continued)

FOREIGN PATENT DOCUMENTS

| | | |
|---|---|---|
| JP | 2013-176237 A | 9/2013 |
| KR | 10-0975925 B1 | 8/2010 |

(Continued)

OTHER PUBLICATIONS

International Search Report (PCT/ISA/210) issued by the International Searching Authority dated Jun. 11, 2021 in International Application No. PCT/KR2021/001894.

*Primary Examiner* — Michael A Faragalla
(74) *Attorney, Agent, or Firm* — Sughrue Mion, PLLC

(57) ABSTRACT

A display apparatus includes a body; a display provided in the body; a processor provided in the body and configured to control the display to display an image; and a power supply including an adapter configured to be detachable from the body, and a power assembly configured to receive power from the adapter in a non-contact manner and supply the power to at least one of the display and the processor.

14 Claims, 29 Drawing Sheets

(56) References Cited

U.S. PATENT DOCUMENTS

| | | | | |
|---|---|---|---|---|
| 2014/0312840 A1* | 10/2014 | Hagihara | ............... | H04B 3/548 |
| | | | | 320/109 |
| 2017/0107739 A1* | 4/2017 | Ruff | ........................ | E05B 1/003 |
| 2018/0131371 A1* | 5/2018 | Liu | ........................ | H03K 17/94 |
| 2020/0061456 A1* | 2/2020 | Bruckbock | ......... | H02J 7/00302 |
| 2020/0161907 A1* | 5/2020 | Yang | ........................ | H02J 50/10 |

FOREIGN PATENT DOCUMENTS

| | | |
|---|---|---|
| KR | 10-2014-0011755 A | 1/2014 |
| KR | 10-1412679 B1 | 6/2014 |
| KR | 10-2016-0047578 A | 5/2016 |
| KR | 10-2017-0041448 A | 4/2017 |
| KR | 10-1849026 B1 | 4/2018 |
| WO | 2019/033033 A1 | 2/2019 |

\* cited by examiner

DISPLAY APPARATUS

CROSS-REFERENCE TO RELATED APPLICATIONS

This application is continuation application of International Application No. PCT/2021/001894, filed on Feb. 15, 2021, which is based on and claims priority to Korean Patent Application No. 10-2020-0052036, filed on Apr. 29, 2020, in the Korean Intellectual Property Office, the disclosures of which are incorporated by reference herein in their entireties.

BACKGROUND

1. Field

The disclosure relates to a display apparatus and a controlling method thereof, and more particularly, to a display including an adapter for supplying power and a controlling method thereof.

2. Description of Related Art

A display apparatus visually displays image information received from an external source or stored therein, and is used in various fields such as home or workplace.

For example, the display apparatus includes a monitor device connected to a personal computer (PC) or a server computer, a portable computer device, a navigation terminal device, a general television device, an Internet Protocol television (IPTV) device, a portable terminal device, such as a smart phone, a tablet PC, a personal digital assistant (PDA), or a cellular phone, various display apparatuses used to reproduce images, such as advertisements or movies in an industrial field, or various kinds of audio/video systems.

Recently, a display apparatus has become larger in size and smaller in thickness.

As the display apparatus has become larger in size, the number of light source elements used to generate an image has been increased, and power to be supplied to the increased number of light source elements has also been increased. In order to stably supply the power to the increased number of light source elements, the volume of a power circuit (e.g., capacitor and/or inductor) that supplies the power to the display apparatus has been increased.

As such, the increase in the volume of the power circuit acts as a factor that impedes the small thickness of the display apparatus.

SUMMARY

Provided is a display apparatus that receives power from an adapter that is separable from the display apparatus.

Also provided is a display apparatus that receives high-voltage power from an adapter through a magnetic interaction between the adapter and the display apparatus, and receives low-voltage power from the adapter through an electrical connection between the adapter and the display apparatus.

Additional aspects will be set forth in part in the description which follows and, in part, will be apparent from the description, or may be learned by practice of the presented embodiments.

According to an aspect of the disclosure, a display apparatus includes: a body; a display provided in the body; a processor provided in the body and configured to control the display to display an image; and a power supply including an adapter configured to be detachable from the body, and a power assembly configured to receive power from the adapter in a non-contact manner and supply the power to at least one of the display and the processor.

The power supply may further include a transformer including: a first magnetic core disposed in the adapter; a primary coil wound around the first magnetic core; a second magnetic core disposed in the body; and a secondary coil wound around the second magnetic core, and the primary coil and the first magnetic core may be magnetically associated with the secondary coil and the second magnetic core without being in contact with the second magnetic core.

The adapter may include an adapter connector in which the first magnetic core and the primary coil are disposed, the body may include a body connector in which the second magnetic core and the secondary coil are disposed, and a connector concave portion into which the adapter connector is insertable, and when the adapter connector is inserted into the connector concave portion, the first magnetic core is aligned with the second magnetic core.

The adapter connector may include a guide protrusion extending in a direction in which the adapter connector is inserted into the connector concave portion, and configured to guide the adapter connector to be inserted into the connector concave portion, and the connector concave portion may include a guide groove extending in the direction in which the adapter connector is inserted into the connector concave portion, and configured to guide the adapter connector to be inserted into the connector concave portion.

The adapter connector may include a first magnet provided on a first surface of the adapter connector at which the first magnetic core is aligned with the second magnetic core, and the connector concave portion may include a second magnet provided on a second surface of the connector concave portion at which the second magnetic core is aligned with the first magnetic core.

The adapter connector may include an insertion protrusion which protrudes in a direction in which the adapter connector is inserted into the connector concave portion and in which at least a portion of the first magnetic core is disposed, and the connector concave portion may include an insertion groove recessed in the direction in which the adapter connector is inserted into the connector concave portion and which has a recessed end in which at least a portion of the second magnetic core is disposed.

The body connector may include a metal structure configured to block a magnetic field leaking between the first magnetic core and the second magnetic core.

The first magnetic core may have an "E" shape, the second magnetic core may have an "E" shape, and the first magnetic core and the second magnetic core may be disposed such that three legs of the first magnetic core are aligned with three legs of the second magnetic core when the adapter connector is inserted into the connector concave portion.

The first magnetic core may have an "I" shape, the second magnetic core may have a "U" shape, and the first magnetic core and the second magnetic core may be disposed such that the first magnetic core is inserted between two legs of the second magnetic core when the adapter connector is inserted into the connector concave portion.

The adapter may include an adapter connector including a primary coil having an annular shape, the power assembly may include a body connector including a secondary coil having an annular shape and a connector concave portion corresponding to the adapter connector, the first magnetic core may have an annular shape, the second magnetic core may have an annular shape, and a center of the primary coil having an annular shape may be located on a same central axis as a center of the secondary coil having an annular shape when the adapter connector is inserted into the connector concave portion.

The first magnetic core may have a "T" shape, the second magnetic core may have a "U" shape, and the first magnetic core and the second magnetic core may be disposed such that one leg of the first magnetic core is inserted between two legs of the second magnetic core when the adapter connector is inserted into the connector concave portion.

The adapter connector may include a plurality of first electrodes disposed along an outer periphery of the first magnetic core, the body connector may include a plurality of second electrodes disposed along an outer periphery of the second magnetic core, and the plurality of first electrodes may be in contact with the plurality of second electrodes, when the adapter connector is inserted into the connector concave portion.

The processor may be further configured to identify whether the first magnetic core is aligned with the second magnetic core based on whether the plurality of first electrodes are in contact with the plurality of second electrodes.

The body connector may include a closed loop disposed along an outer periphery of the second magnetic core.

The processor may be further configured to identify whether the first magnetic core is aligned with the second magnetic core based on a current induced in the closed loop.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
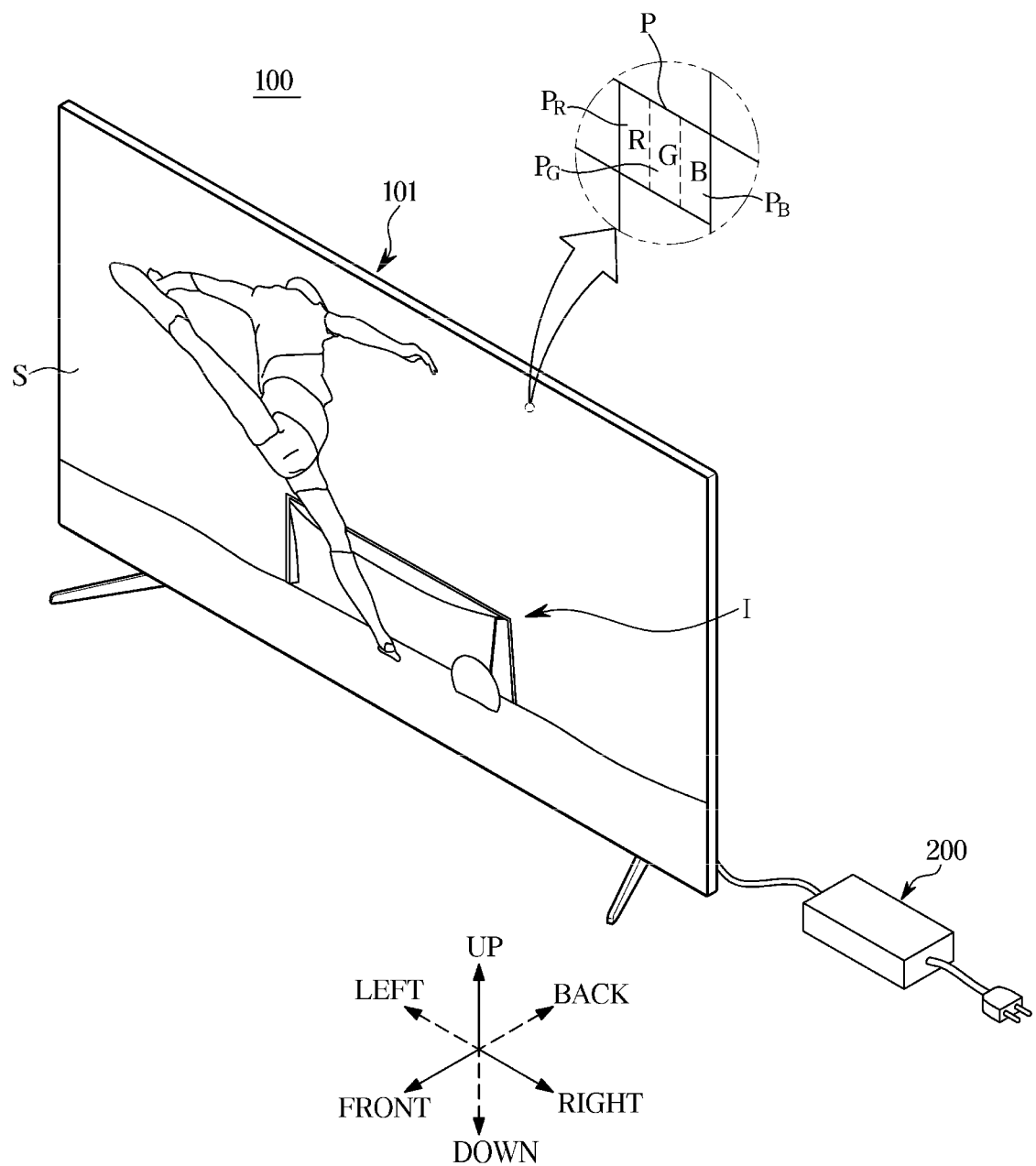
FIG. 1 illustrates an appearance of a display apparatus according to an embodiment.

Throughout the specification, like reference numerals refer to like components. This specification does not describe all components of embodiments, and common descriptions in the technical field to which the present disclosure pertains and redundant descriptions between the embodiments will be omitted. Terms "unit," "portion," "module," "member," and "block" used in this specification may be implemented in software or hardware, and according to embodiments, a plurality of "units," "portions," "modules," "members," and "blocks" can be implemented in a single component or a single "unit," "portion" "module," "member," or "block" can include a plurality of components.

Throughout this specification, when a part is referred to as being "connected" to other parts, it includes not only a direct connection but also an indirect connection, and the indirect connection includes a connection through a wireless communication network.

It will be understood that the terms "include" and/or "including," when used herein, specify the presence of stated components but do not preclude the presence or addition of one or more other components unless mentioned otherwise.

Throughout this specification, when describing that a certain member is located "on" another member, this includes not only a case in which the certain member adjoins another member but also a case in which a different another member is present between the two members.

Terms "first," "second," and the like are used to distinguish one component from other components, and components are not limited by these terms.

The singular forms include plural forms unless the context clearly notes otherwise.

In each of operations, a reference numeral is used for convenience of description, and this reference numeral does not describe the order of the operations, and the operations may be differently performed from the described order unless clearly specified in the context.

Hereinafter, an operation principle and embodiments of the present disclosure will be described with reference to the accompanying drawings.

FIG. 1 illustrates an appearance of a display apparatus according to an embodiment.

A display apparatus 100 is a device that may process an image signal received from the outside and visually display the processed image. Hereinafter, a case in which the display apparatus 100 is a television (TV) is exemplified, but the present disclosure is not limited thereto. For example, the display apparatus 100 may be implemented in various forms, such as a monitor, a portable multimedia device, a portable communication device, a portable computing device, and the like, and the form of the display apparatus 100 is not limited as long as it is a device that visually displays an image.

In addition, the display apparatus 100 may be a large format display (LFD) device installed in an outdoor place, such as a roof of a building or a bus stop. Here, the outdoor place is not necessarily limited to the outdoors, and the display apparatus 100 according to an embodiment may be installed in any place wherever a large number of people can enter or exit, such as a subway station, a shopping mall, a movie theater, a company, a store, or the like even when the place is an indoor place.

The display apparatus 100 may receive video signals and audio signals from various content sources, and output video and audio corresponding to the video signals and the audio signals. For example, the display apparatus 100 may receive television broadcast content through a broadcast receiving antenna or a wired cable, receive content from a content playback device, or receive content from a content providing server of a content provider.

As shown in FIG. 1, the display apparatus 100 may include a body 101, which accommodates a plurality of components for displaying images, and a screen S provided on one side of the body 101 to display an image I.

The body 101 may form an appearance of the display apparatus 100, and components for enabling the display apparatus 100 to display the image I may be provided inside the body 101. The body 101 shown in FIG. 1 is in the shape of a flat plate, but the shape of the body 101 is not limited to that shown in FIG. 1. For example, the body 101 may have a shape in which left and right ends protrude forward and a center part is curved so as to be concave.

The screen S is formed on a front surface of the body 101, and the image I, which is visual information, may be displayed on the screen S. For example, a still image or a moving image may be displayed on the screen S, and a two-dimensional plane image or a three-dimensional stereoscopic image may also be displayed on the screen S.

A plurality of pixels P may be formed on the screen S, and the image I displayed on the screen S may be formed by a combination of light emitted from the plurality of pixels P. For example, the single image I may be formed on the screen S by combining the light emitted by the plurality of pixels P like a mosaic.

Each of the plurality of pixels P may emit light of various brightness and various colors.

In order to emit light of various brightness, each of the plurality of pixels P may include a configuration (for example, an organic light emitting diode) capable of emitting light directly or a configuration (for example, a liquid crystal panel) capable of passing or blocking light emitted by a backlight unit or the like.

In order to emit light of various colors, each of the plurality of pixels P may include sub-pixels $P_r$, $P_g$, and $P_b$.

The sub-pixels $P_r$, $P_g$, and $P_b$ may include a red sub-pixel $P_r$ capable of emitting red light, a green sub-pixel $P_g$ capable of emitting green light, and a blue sub-pixel $P_b$ capable of emitting blue light. For example, the red light may represent light having a wavelength of approximately 620 nm (nanometers, one billionth of a meter) to 750 nm, the green light may represent light having a wavelength of approximately 495 nm to 570 nm, and the blue light may represent light having a wavelength of approximately 450 nm to 495 nm.

By combining the red light of the red sub-pixel $P_r$, the green light of the green sub-pixel $P_g$ and the blue light of the blue sub-pixel $P_b$, each of the plurality of pixels P may emit light of various brightness and various colors.

The screen S shown in FIG. 1 is in the shape of a flat plate, but the shape of the screen S is not limited to that shown in FIG. 1. For example, depending on the shape of the body 101, the screen S may have a shape in which left and right ends protrude forward and a center part is curved so as to be concave.

The display apparatus 100 includes an adapter 200. The adapter 200 may be separate from the display apparatus 100 and may receive power from an external power source (e.g., alternating current (AC) power source of 110 V or 220 V for households), and may convert the received power and supply the converted power to the display apparatus 100.

For example, the display apparatus 100 may include a power circuit for supplying the power to electrical components included in the display apparatus 100. The power circuit may be provided while being distributed in the body 101 and the adapter 200 of the display apparatus 100. In other words, at least a portion of the power circuit may be provided in the adapter 200 of the display apparatus 100, and another portion of the power circuit may be provided in the body 101 of the display apparatus 100.

Since a portion of the power circuit included in the display apparatus 100 is provided in the adapter 200 as described above, a thickness of the display apparatus 100 may be reduced.

Figure 2:
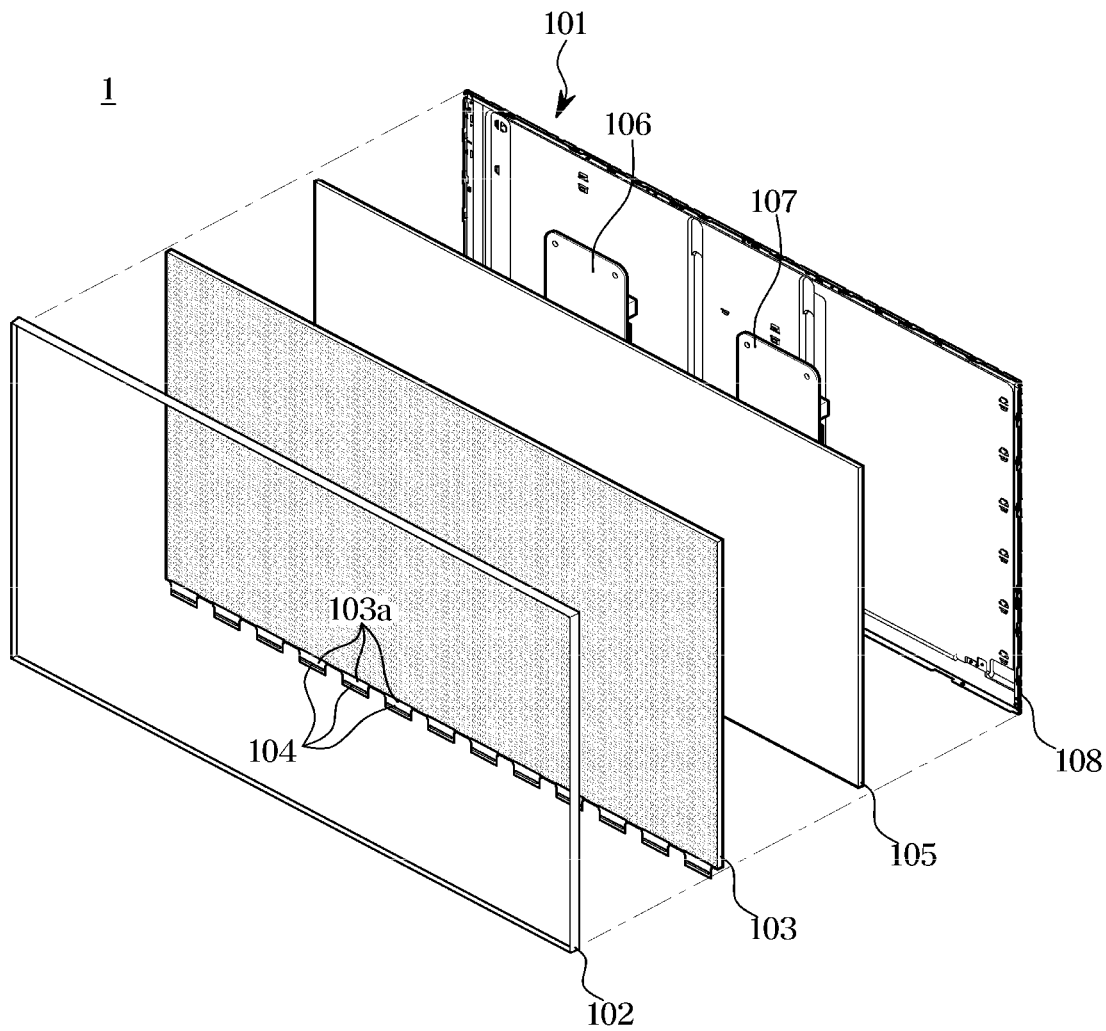
FIG. 2 illustrates an exploded view of the display apparatus according to an embodiment.
Figure 2:
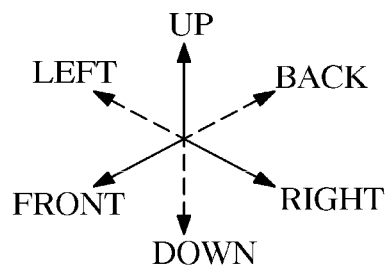

FIG. 2 illustrates an exploded view of the display apparatus according to an embodiment.

As shown in FIG. 2, the display apparatus 100 includes a display panel 103 configured to generate an image by emitting light in a front direction, a control assembly 106 in which a configuration for controlling operations of the display panel 103 is mounted, a power assembly 107 in which a configuration for supplying a power source to the display panel 103 and the control assembly 106 is mounted, a bottom chassis 108 configured to support/fix the control assembly 106 and the power assembly 107, and a bezel 102 and a rear cover 105 configured to prevent the display panel 103, the control assembly 106, and the power assembly 107 from being exposed to the outside.

A front surface (light-emitting surface) of the display panel 103 may form the above-described screen S of the display apparatus 100, and the above-described pixels P or sub-pixels Pr, Pg, and Pb may be formed on the display panel 103.

The display panel 103 may include various types of display panels capable of displaying the image I. For example, the display panel 103 may be a liquid crystal display (LCD) panel, a light-emitting diode (LED) panel, an organic LED (OLED) panel, a quantum dot LED (QLED) panel, or a quantum dot (QD) display panel.

A cable 103a configured to transmit image data to the display panel 103, and a display driver integrated circuit (hereinafter referred to as a 'driver IC') 104 configured to process digital image data to output an analog image signal are provided at one side of the display panel 103.

The cable 103a may electrically connect between the control assembly 106 and the power assembly 107, which are described above, and the driver IC 104, and may also electrically connect between the driver IC 104 and the display panel 103. The cable 103a may include a flexible flat cable or a film cable that is bendable, or the like.

The driver IC 104 may receive the image data and the power from the control assembly 106 and the power assembly 107, respectively, through the cable 103a, and supply an image signal and a driving current to the display panel 103 through the cable 103a.

In addition, the cable 103a and the driver IC 104 may be integrally formed as a film cable, a chip on film (COF), a tape carrier package (TCP), or the like. In other words, the driver IC 104 may be disposed on the cable 103a. However, the present disclosure is not limited thereto, and the driver IC 104 may be disposed on the display panel 103 or the control assembly 106.

The control assembly 106 may include a control circuit (or processing circuit) configured to control an operation of the display panel 103 and process the image. The control circuit may process image data received from an external content source and transmit the image data to the display panel 103 so that the plurality of pixels P emit light having different colors and different brightness.

The power assembly 107 may include a portion of the power circuit for supplying the power to the control assembly 106 and/or the display panel 103. For example, another portion of the power circuit may be provided in the adapter 200.

The control assembly 106 and the power assembly 107 may each be implemented with a printed circuit board and various circuits mounted on the printed circuit board. For example, the power supply circuit may include a capacitor, a coil, a resistance element, a microprocessor, and the like and a power circuit board on which they are mounted. In addition, the control circuit may include a memory, a microprocessor, and a control circuit board on which the memory and the microprocessor are mounted.

Figure 3:
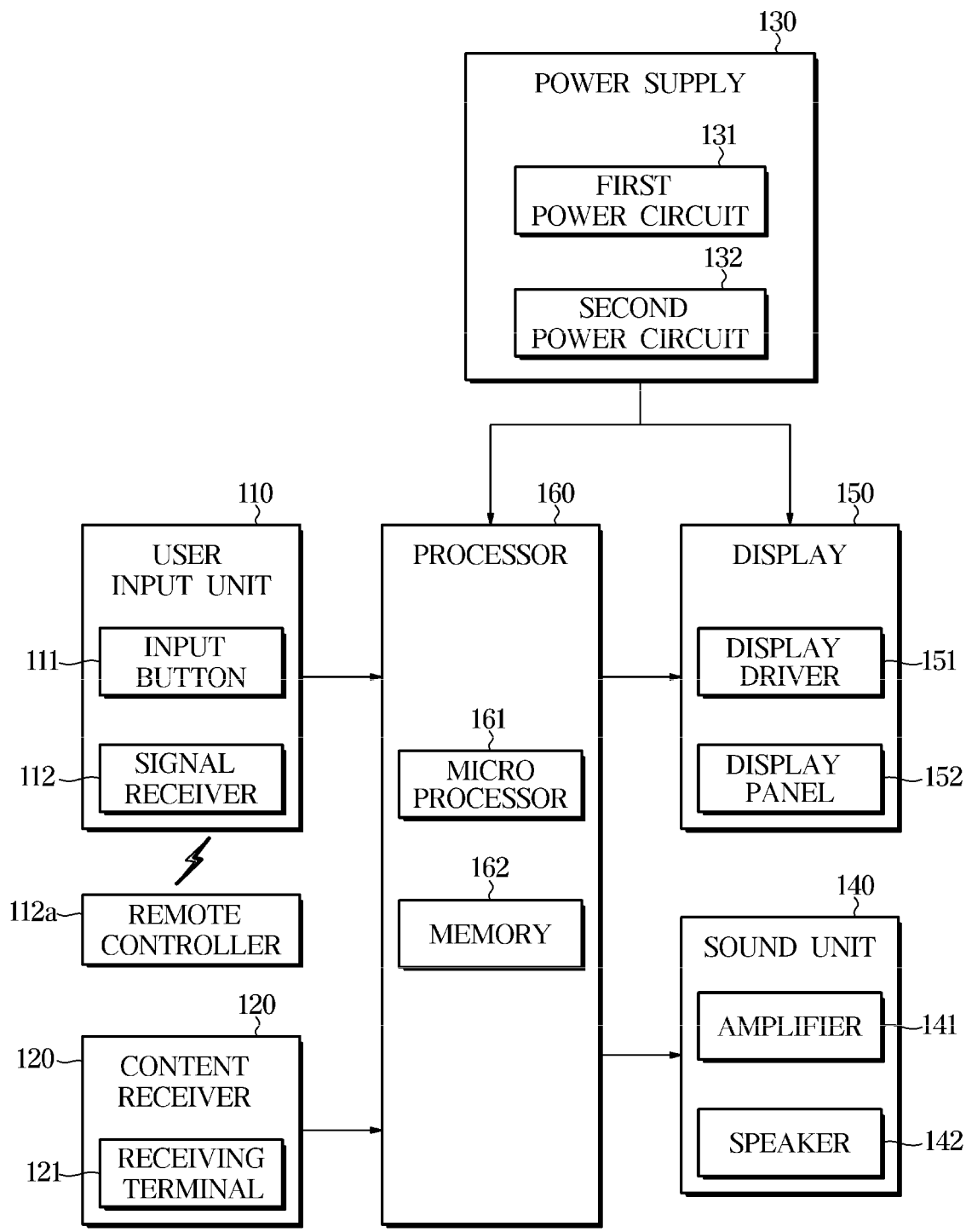
FIG. 3 illustrates a configuration of the display apparatus according to an embodiment.
Figure 4:
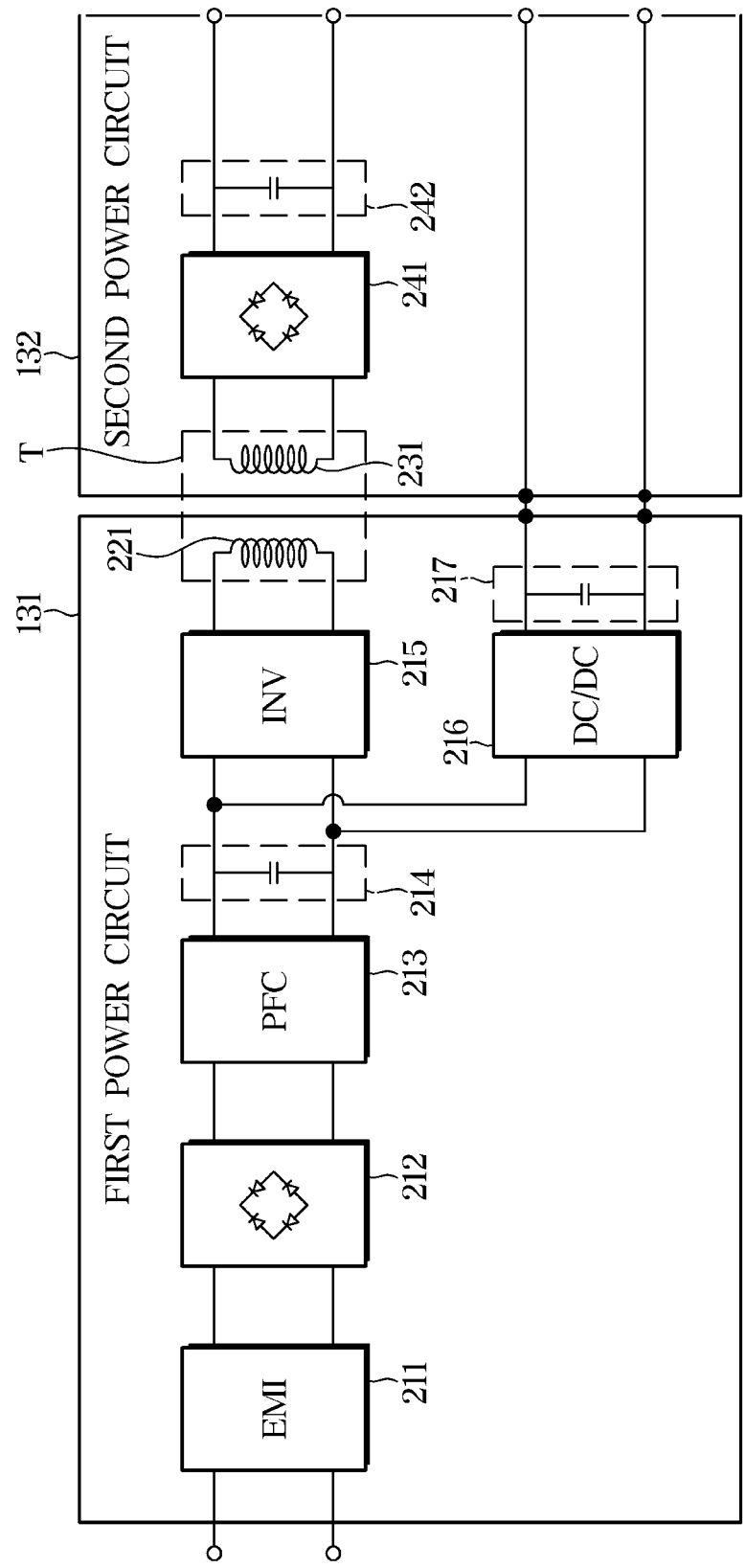
FIG. 4 illustrates a configuration of a power supply included in the display apparatus according to an embodiment.

FIG. 3 illustrates a control configuration of the display apparatus according to an embodiment. FIG. 4 illustrates a configuration of a power supply included in the display apparatus according to an embodiment.

Referring to FIGS. 3 and 4, the display apparatus 100 includes a user input unit 110 configured to receive a user input from a user, a content receiver 120 configured to receive a video signal and/or an audio signal from content sources, a processor 160 configured to process the video signal and/or the audio signal received by the content receiver 120 and control an operation of the display apparatus 100, a power supply 130 configured to supply power to components of the display apparatus 100, a sound unit 140 configured to output a sound processed by the processor 160, and a display 150 configured to display an image processed by the processor 160.

The user input unit 110 may include input buttons 111 configured to receive the user input. For example, the user input unit 110 may include a power button configured to obtain a user input for turning on or off the display apparatus 100, a sound control button configured to obtain a user input for adjusting the volume of the sound output by the display apparatus 100, a source selection button configured to obtain a user input for selecting a content source, and the like.

The input buttons 111 may each receive a user input and output an electrical signal corresponding to the user input to the processor 160. The input buttons 111 may include a tact switch, a push switch, a slide switch, a toggle switch, a micro switch, or a touch switch.

The user input unit 110 also includes a signal receiver 112 configured to receive a remote control signal of a remote controller 112a. The remote controller 112a configured to receive a user input may be provided separately from the display apparatus 100, and may receive the user input and transmit a wireless signal corresponding to the user input to the display apparatus 100. The signal receiver 112 may receive the wireless signal corresponding to the user input from the remote controller 112a and output an electrical signal corresponding to the user input to the processor 160.

The content receiver 120 may include a receiving terminal 121 configured to receive content including the video signal and/or the audio signal from the content sources.

The receiving terminal 121 may receive the video signal and the audio signal from the content sources through a cable. For example, the receiving terminal 121 may be a component (YPbPr/RGB) terminal, a composite (composite video blanking and sync (CVBS)) terminal, an audio terminal, a high-definition multimedia interface (HDMI) terminal, a universal serial bus (USB) terminal, and the like.

The content receiver may optionally further include a tuner. The tuner may receive broadcast signals through a broadcast receiving antenna or a wired cable and extract a broadcast signal of a channel selected by the user from the broadcast signals. For example, the tuner may pass a broadcast signal having a frequency corresponding to a channel selected by the user among a plurality of broadcast signals received through the broadcast receiving antenna or the wired cable, and block the broadcast signals having other frequencies.

As such, the content receiver 120 may receive the video signal and the audio signal from the content sources through the receiving terminal 121, and may output the video signal and/or the audio signal received through the receiving terminal 121 to the processor 160.

The processor 160 includes a microprocessor 161 configured to process data and a memory 162 configured to memorize/store data. The microprocessor 161 and the memory 162 may be implemented as a separate semiconductor element (chip) or may be implemented as a single semiconductor element (chip). In addition, the processor 160 may include a plurality of microprocessors or a plurality of memories.

The memory 162 may store programs and data for controlling the display apparatus 100, and may temporarily store data generated while the display apparatus 100 is being controlled.

The memory 162 may store the programs and data for processing the video signal and/or the audio signal, and may temporarily store the data generated while processing the video signal and/or the audio signal.

The memory 162 may include a non-volatile memory such as a read-only memory (ROM) or flash memory for storing data for a long period of time, and a volatile memory such as a static random access memory (S-RAM) or dynamic random access memory (D-RAM) for temporarily storing the data.

The microprocessor 161 may receive the video signal and/or the audio signal from the content receiver 120, decode the video signal to generate image data, and decode the audio signal to generate audio data. The image data and the audio data may be output to the display 150 and the sound unit 140, respectively.

In addition, the microprocessor 161 may receive the user input from the user input unit 110, and generate a control signal for controlling the content receiver 120, the display 150, and/or the sound unit 140 according to the user input.

The processor 160 may process the video signal and/or the audio signal received by the content receiver 120, and reproduce the image and the sound from the video signal and/or the audio signal. Specifically, the processor 160 may decode the video signal and/or the audio signal into image data and audio data.

The processor 160 may control operations of the content receiver 120, the display 150, and the sound unit 140 according to the user input. For example, when a content source is selected by a user input, the processor 160 may control the content receiver 120 to receive the video signal and/or the audio signal from the selected content source.

The processor 160 may be implemented as the control circuit in the control assembly 106.

The sound unit 140 includes an amplifier 141 configured to amplify a sound and a speaker 142 configured to audibly output the amplified sound.

The speaker 142 may convert an analog sound signal amplified by the amplifier 141 into an audible sound (sound wave). For example, the speaker 142 may include a thin film that vibrates according to an electrical sound signal, and sound waves may be generated by the vibration of the thin film.

The display 150 includes a display panel 152 configured to visually display the image data, and a display driver 151 configured to provide the image data to the display panel 152 and drive the display panel 152.

The display panel 152 may generate an image according to the image data received from the display driver 151 and display the image.

The display panel 152 may include a plurality of pixels serving as a unit for displaying the image. Each of the pixels may receive an electrical signal representing the image from the display driver 151 and output an optical signal corresponding to the received electrical signal. The plurality of pixels may be disposed, for example, in a plurality of rows (a plurality of pixel rows) and a plurality of columns (a plurality of pixel columns). As such, the optical signal output from the plurality of pixels disposed in a two-dimensional matrix form may be combined so that one image may be displayed on the display panel 152.

The display panel 152 may typically be an LCD panel, an LED panel, or a QD display panel.

The LCD panel may include a backlight unit configured to emit surface light forward, and a liquid crystal panel configured to block or pass the light emitted from the backlight unit. The backlight unit may include a point light source (e.g., an LED or the like) that emits monochromatic light or white light, and an optical member (e.g., a light guide plate, a diffuser plate, or the like) that diffuses the light emitted from the point light source into uniform surface light. The liquid crystal panel includes a plurality of pixels P, and the plurality of pixels P may each independently block or pass light emitted from the backlight unit. The light passing through the plurality of pixels P may be colored (e.g., red, green, or blue) by a color filter, and may form an image.

The LED panel includes a plurality of LEDs, and each of the plurality of LEDs may emit light having a predetermined wavelength. For example, the plurality of LEDs may emit any one of red, green, and blue, and may form a sub-pixel. Light emitted from each of the plurality of LEDs may form an image.

The display driver 151 may be implemented as the driver IC 104.

The display driver 151 may include a scan driver, a data driver, and a timing controller. The scan driver may provide a scan signal for activating any one of the plurality of pixel rows under the control of the timing controller to the display panel 152. The data driver may sequentially obtain image data from the processor 160, and may provide an analog signal corresponding to the image data to the plurality of pixel columns included in the display panel 152 under the control of the timing controller. The timing controller may control the scan driver and the data driver to sequentially provide the image data to the plurality of pixels.

The power supply 130 may supply power to all electrical components included in the display apparatus 100. The power supply 130 may supply power to, for example, the display 150 and the processor 160.

In relation to the power source, the display apparatus 100 may be placed in three states, and the power may be supplied to the processor 160 or the display 150 or cut off depending on a state of the power source of the display apparatus 100.

The display apparatus 100 may be placed in an "off state" in which a plug is not inserted into a power source socket. The power may not be supplied to most electrical components included in the display apparatus 100 in the "off state." Exceptionally, power may be supplied to some components of the display apparatus 100 from a battery.

The display apparatus 100 may be placed in a "standby state" in which the plug is inserted into the power source socket and a user's power supply command (or operation command) is not input. In the "standby state," the power may be supplied to some of the components included in the display apparatus 100. For example, in the "standby state," the power may be supplied to the processor 160 and may not be supplied to the display 150 and the like.

The display apparatus 100 may be placed in an "on state" in which the plug of the display apparatus 100 is inserted into the power source socket and the user's power supply command (or operation command) is input. In the "on state," the power may be supplied to all components included in the display apparatus 100. In other words, in the "on state," the power may be supplied to both the processor 160 and the display 150.

The power supply 130 may include a first power circuit 131 provided in the adapter 200 detachable from the display apparatus 100, and a second power circuit 132 provided in the power assembly 107 of the display apparatus 100.

As shown in FIG. 4, the power supply 130 includes an electro-magnetic interference (EMI) filter 211, a first rectifier 212, a power factor correction (PFC) 213, a first direct current (DC) link capacitor 214, an inverter 215, a transformer T, a second rectifier 241, a second DC link capacitor 242, a DC-DC converter 216, and a third DC link capacitor 217.

The EMI filter 211 may suppress and block noise included in external AC power supplied from the external power source. For example, the EMI filter 211 may block a high-frequency component included in the external AC power and pass the AC power of a low frequency (e.g., 60 Hz or 50 Hz).

The first rectifier 212 full-wave rectifies the external AC power supplied from the external power source. For example, an AC voltage having a negative value and a positive value may be converted into a voltage having a positive value, and an AC current having a negative value and a positive value may be converted to a current having a positive value. The full-wave rectified voltage may include a DC component (DC voltage) and an AC component (ripple).

The PFC 213 may adjust a phase of the AC power supplied to the display apparatus 100 so that the external AC power supplied from the external power source is effectively supplied to the display apparatus 100. A power factor may represent a ratio of active power to apparent power. The apparent power represents the power supplied from the external power source to the display apparatus 100 in appearance, and the active power represents the power actually supplied to the display apparatus 100 and consumed by the display apparatus 100. Generally, when a phase of the voltage applied from the external AC power source matches a phase of the current consumed by the display apparatus 100, the power factor may be increased, and as a difference between the phase of the external voltage and the phase of the consumption current increases, the power factor may be reduced.

The PFC 213 may adjust the phase of the current supplied to the display apparatus 100 from the external power source such that the difference between the phase of the external voltage and the phase of the consumption current is reduced (e.g., the phase of the external voltage matches the phase of the consumption current).

The first DC link capacitor 214 may smooth the voltage rectified by the first rectifier 212. In other words, the first DC link capacitor 214 may remove the AC component (ripple) of the full-wave rectified voltage and output the DC voltage. An output voltage value of the first DC link capacitor 214 may be similar to a maximum value of the external AC voltage. For example, when an AC voltage having a root-mean-square value of 220 V is supplied, an output voltage of the first DC link capacitor 214 may be approximately 310 V.

The inverter 215 may convert the DC voltage and the DC current output from the first DC link capacitor 214 into an AC voltage and an AC current, respectively. For example, the inverter 215 may include a plurality of switches, and may output the AC current and the AC voltage that vary over time in accordance with the opening and closing of the plurality of switches.

The transformer T may transmit the AC current and the AC voltage output from the inverter 215 to the second rectifier 241 using a magnetic interaction between a plurality of coils 221 and 231. For example, the transformer T may include a primary coil 221 connected to the inverter 215 and a secondary coil 231 connected to the second rectifier 241, and may magnetically associate the primary coil 221 and the secondary coil 231. In other words, the transformer T may be fabricated such that a magnetic field generated by the primary coil 221 passes through the secondary coil 231.

The transformer T may increase or decrease the AC voltage. For example, the transformer T may step up the AC voltage output from the inverter 215 according to a ratio of the number of turns of the primary coil 221 and the number of turns of the secondary coil 231 to output the stepped up AC voltage to the second rectifier 241, or may step down the AC voltage output from the inverter 215 to output the stepped down AC voltage to the second rectifier 241.

The transformer T may electrically separate the internal components of the display apparatus 100 from the external AC power source. Accordingly, even when a sudden voltage variation (e.g., a surge voltage) is introduced from the external AC power source, the voltage variation may be prevented by the transformer T and may not be transmitted to the internal components of the display apparatus 100.

The second rectifier 241 full-wave rectifies the AC power output from the transformer T. The second rectifier 241 may provide a similar function to the first rectifier 212.

The second DC link capacitor 242 may smooth the voltage rectified by the second rectifier 241. The second DC link capacitor 242 may provide a similar function to the first DC link capacitor 214.

The DC-DC converter 216 may step down the DC voltage output from the first DC link capacitor 214 and output the stepped down DC voltage. For example, the DC-DC converter 216 may convert power of 310 V output from the first DC link capacitor 214 into power of 12 V and output the power of the converted voltage.

The third DC link capacitor 217 may smooth the voltage output from the DC-DC converter 216. The third DC link capacitor 217 may provide a similar function to the first DC link capacitor 214.

The power supply 130 may provide high-voltage power to the electrical components of the display apparatus 100 using the inverter 215, the transformer T, and the second rectifier 241 in the "on state" of the display apparatus 100, and may provide low-voltage power to the electrical components of the display apparatus 100 using the DC-DC converter 216 in the "standby state."

The first power circuit 131 installed in the adapter 200 includes the EMI filter 211, the first rectifier 212, the PFC 213, the inverter 215, the primary coil 221 of the transformer T, and the DC-DC converter 216, and the second power circuit 132 installed in the body 101 includes the secondary coil 231 of the transformer T and the second rectifier 241. In other words, the EMI filter 211, the first rectifier 212, the PFC 213, the inverter 215, the primary coil 221 of the transformer T, and the DC-DC converter 216 may be provided in the adapter 200, and the secondary coil 231 of the transformer T and the second rectifier 241 may be provided in the body 101.

As such, since the display apparatus 100 includes the adapter 200 for supplying the power, the power circuit, which is large in volume, such as the EMI filter 211, the first rectifier 212, the PFC 213, the inverter 215, the primary coil 221 of the transformer T, and the like may be removed from the body 101. Accordingly, the body 101 may be reduced in thickness.

A portion (primary coil) of the transformer T may be disposed in the adapter 200, and another portion (secondary coil) of the transformer T may be disposed in the body 101. In addition, the primary coil 221 and the secondary coil may not be in electrical or physical contact with each other, but may magnetically interact with each other. As such, since the adapter 200 and the body 101 are coupled by a magnetic interaction between the primary coil 221 and the secondary coil 231 of the transformer T, a safety accident of the user may be prevented and power transmission efficiency may be increased.

Figure 5:
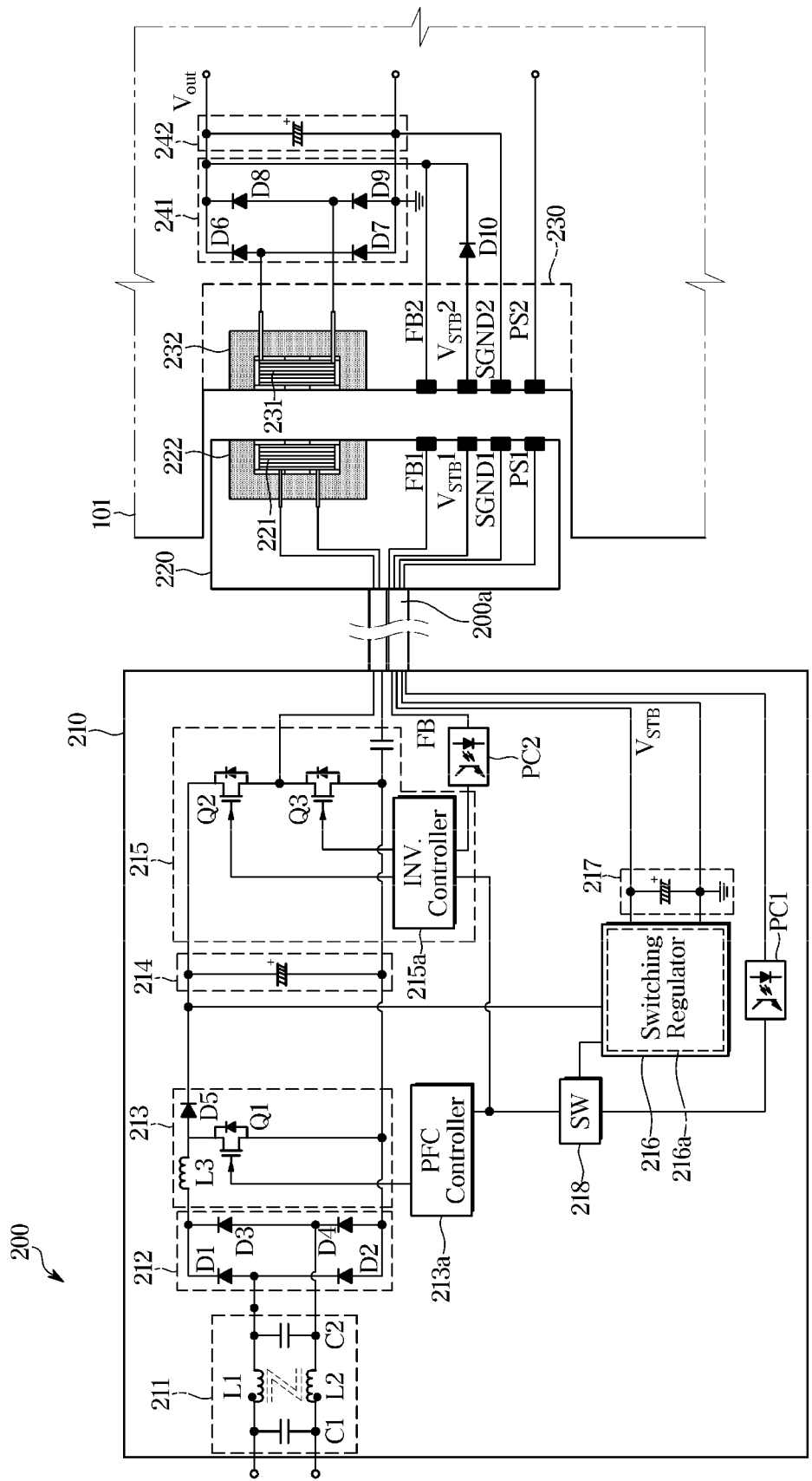
FIG. 5 illustrates a circuit of the power supply included in the display apparatus according to an embodiment.

FIG. 5 illustrates a circuit of the power supply included in the display apparatus according to an embodiment.

As shown in FIG. 5, the adapter 200 includes the adapter body 101 and an adapter connector 220. The adapter connector 220 may be connected to the adapter body 101 through a power cable 200a.

In the adapter body 101, the EMI filter 211, the first rectifier 212, the PFC 213, the first DC link capacitor 214, the inverter 215, the DC-DC converter 216, the third DC link capacitor 217, and a switch circuit 218 are provided.

The EMI filter 211 includes, for example, capacitors C1 and C2 and inductors L1 and L2. The inductors L1 and L2 are provided in a pair of lines, respectively, and may provide a symmetrical inductance to each of the pair of lines. A high-frequency component of input power may be blocked by the symmetric inductances of the inductors L1 and L2. The capacitor C1 may be provided on a front end of the inductors L1 and L2, and the capacitor C2 may be provided on a rear end of the inductors L1 and L2. Due to the capacitors C1 and C2, the high-frequency component of the input power may be bypassed.

The first rectifier 212 includes a diode bridge having, for example, four diodes D1, D2, D3, and D4. The diode bridge may apply a positive component of an AC voltage to a positive line and apply a negative component thereof to a negative line.

The PFC 213 includes an inductor L3, a diode D5, a switch Q1, and a PFC controller 213a. While the switch Q1 is turned on, a current flows through the inductor L3 and the switch Q1, and while the switch Q1 is turned off, the current flows through inductor L3 and the diode D5. The PFC controller 213a may control an output current by periodically turning on/off the switch Q1 so that a phase of an input voltage of the external AC power source matches a phase of an output current of the PFC 213.

A voltage output from the PFC 213 is applied to the first DC link capacitor 214, and the first DC link capacitor 214 may output a DC voltage having a high voltage value. For example, the output voltage value of the first DC link capacitor 214 may be similar to the maximum value of the external AC voltage.

The inverter 215 includes, for example, a half-bridge inverter having a pair of switches Q2 and Q3 connected in series between the positive line and the negative line and a capacitor C3, and an inverter controller 215a configured to control the switches Q2 and Q3 of the half-bridge inverter. While the switch Q2 is turned on and the switch Q3 is turned off, the current may flow to the primary coil 221 and the capacitor C3 through the switch Q2, and while the switch Q2 is turned off and the switch Q3 is turned on, the current may flow through switch Q3 from the capacitor C3 and the primary coil 221. Accordingly, the inverter 215 may supply the AC current whose direction changes over time to the primary coil 221. The inverter controller 215a may supply the AC current to the primary coil 221 by alternately turning on/off the switches Q2 and Q3.

The DC-DC converter 216 may include, for example, a switching regulator 216a, which converts the input power into a voltage pulse using a switch and smooths the voltage pulse using a filter. The switching regulator 216a may output a DC voltage having a low voltage of, for example, approximately 12 V.

The switch circuit 218 may receive a "power source on signal" or a "power source off signal" that is received from the body 101 through an electric contact PS1. In addition, the switch circuit 218 may activate the PFC 213 and the inverter 215 or deactivate the PFC 213 and the inverter 215 depending on the "power source on signal" or the "power source off signal."

The display apparatus 100 may transmit the "power source on signal" from the body 101 to the adapter 200 in response to obtaining a user input for turning on the power source. The switch circuit 218 may output a signal for activating the PFC 213 and the inverter 215 in response to receiving the "power source on signal" from the body 101. Due to the activation of the PFC 213 and the inverter 215, high-voltage power may be transmitted from the adapter 200 to the body 101 through a magnetic interaction between the primary coil 221 and the secondary coil 231.

The display apparatus 100 may transmit the "power source off signal" from the body 101 to the adapter 200 in response to obtaining a user input for turning off the power source. The switch circuit 218 may output a signal for deactivating the PFC 213 and the inverter 215 in response to receiving the "power source off signal" from the body 101. Due to the deactivation of the PFC 213 and the inverter 215, the power of the low voltage stepped down by the DC-DC converter 216 may be transmitted from the adapter 200 to the body 101 through electric contacts SGND1 and VSTB1.

In the adapter connector 220, the primary coil 221, a first magnetic core 222, and a plurality of electric contacts PS1, SGND1, VSTB1, and FB1 are provided. The adapter connector 220 may provide an interface between the adapter 200 and the body 101.

The primary coil 221 is wound around the first magnetic core 222. The first magnetic core 222 may be made of a magnetic material having high magnetic permeability. In addition, the first magnetic core 222 may have, for example, an English letter "E" shape, and the primary coil 221 is wound around a central protrusion of three legs of an English letter "E."

The AC current is supplied from the inverter 215 to the primary coil 221, and an alternating magnetic field may be induced in the first magnetic core 222 passing through a center of the primary coil 221 in response to the AC current. The alternating magnetic field induced in the first magnetic core 222 may pass through an air gap between the adapter 200 and the body 101 to be transmitted to a second magnetic core 232, which will be described below, of the body 101, and may induce an AC current in the secondary coil 231.

As such, since the alternating magnetic field induced in the first magnetic core 222 may pass through the air gap between the adapter 200 and the body 101 and may be transmitted to the second magnetic core 232, electric contacts exposed to the outside may not be required to transmit the high-voltage power output from the first DC link capacitor 214 of the adapter 200 to the body 101.

Through the plurality of electric contacts PS1, SGND1, VSTB1, and FB1, an electrical signal may be transmitted between the body 101 and the adapter 200 or low-voltage power may be transmitted from the adapter 200 to the body 101.

The plurality of electric contacts PS1, SGND1, VSTB1, and FB1 include a first adapter contact PS1 for receiving the "power source on signal"/"power source off signal" from the body 101, a second adapter contact SGND1 and a third adapter contact VSTB1 for supplying the low-voltage power to the body 101, and a fourth adapter contact FB1 for receiving a feedback signal from the body 101.

The switch circuit 218 may receive the "power source on signal" or the "power source off signal" from the display apparatus 100 through the first adapter contact PS1. A photo coupler PC1 may be provided between the switch circuit 218 and the first adapter contact PS1 to prevent an overcurrent that is caused by a potential difference between the body 101 and the adapter 200.

The low-voltage power output from the DC-DC converter 216 may be transmitted to the body 101 through the second adapter contact SGND1 and the third adapter contact VSTB1.

The inverter controller 215a of the inverter 215 may receive the feedback signal through the fourth adapter contact FB1 after the inverter 215 is activated. The inverter controller 215a may check whether the high-voltage power is transmitted, depending on the feedback signal. A photo coupler PC2 may be provided between the inverter controller 215a and the fourth adapter contact FB1 to prevent the overcurrent caused by the potential difference between the body 101 and the adapter 200.

The body 101 includes a body connector 230 and the power assembly 107.

The secondary coil 231, the second magnetic core 232, and a plurality of electric contacts PS2, SGND2, VSTB2, and FB2 may be provided in the body connector 230, and may provide an interface between the adapter 200 and the body 101.

The secondary coil 231 is wound around the second magnetic core 232. The second magnetic core 232 may be made of a magnetic material having high magnetic permeability. In addition, the second magnetic core 232 may have, for example, a horizontally inverted English letter "E" shape, and the secondary coil 231 is wound around a central protrusion of three legs of an English letter "E."

The second magnetic core 232 may obtain an alternating magnetic field from the first magnetic core 222 of the adapter connector 220. The alternating magnetic field induced in the first magnetic core 222 may pass through the air gap between the adapter 200 and the body 101 to be transmitted to the second magnetic core 232.

The alternating magnetic field of the second magnetic core 232 may induce an AC current in the secondary coil 231. The secondary coil 231 may output the AC power supplied to the primary coil 221 and the AC power depending on a ratio of the number of turns of the primary coil 221 and the number of turns of the secondary coil 231.

Through the plurality of electric contacts PS2, SGND2, VSTB2, and FB2, an electrical signal may be transmitted between the body 101 and the adapter 200 or low-voltage power may be transmitted from the adapter 200 to the body 101.

The plurality of electric contacts PS2, SGND2, VSTB2, and FB2 include a first body contact PS2 for transmitting the "power source on signal"/"power source off signal" from the body 101 to the adapter 200, a second body contact SGND2 and a third body contact VSTB2 for receiving the low-voltage power from the adapter 200, and a fourth body contact FB2 for transmitting the feedback signal to the adapter 200 from the body 101 that receives the high-voltage power.

The processor 160 provided in the body 101 may transmit the "power source on signal" or the "power source off signal" to the adapter 200 through the first body contact PS2 in response to a user input related to turning on/off the power source.

The power assembly 107 provided in the body 101 may receive the low-voltage power from the adapter 200 through the second body contact SGND2 and the third body contact VSTB2 during the "standby state" of the display apparatus 100.

The power assembly 107 provided in the body 101 may receive the high-voltage power from the adapter 200 and transmit the feedback signal to the adapter 200 through the fourth body contact FB2 in response to receiving the high-voltage power.

The power assembly 107 includes the second rectifier 241 and the second DC link capacitor 242.

The second rectifier 241 includes a diode bridge having, for example, four diodes D6, D7, D8, and D9. The diode bridge may apply a positive component of an AC voltage to a positive line and apply a negative component thereof to a negative line. The voltage rectified by the second rectifier 241 in the "on state" of the display apparatus 100 may be applied to the second DC link capacitor 242.

However, the second rectifier 241 of the body 101 is not limited to a diode bridge. For example, the second rectifier 241 may include a center tapped full wave rectifier in which a center tap of the secondary coil 231 is grounded and each of both ends of the secondary coil 231 is connected to the diodes.

The second DC link capacitor 242 may smooth the high voltage rectified by the second rectifier 241 in the "on state" of the display apparatus 100, and store electrical energy of the low voltage of each of the second body contact SGND2 and the third body contact VSTB2 in the "standby state" of the display apparatus 100.

A diode D10 is provided on the third body contact VSTB2 and the second DC link capacitor 242 to prevent a reverse flow of the current in the "on state" of the display apparatus 100.

As such, the adapter 200 may provide the high-voltage power to the body 101 using the magnetic interaction, and provide the low-voltage power to the body 101 through electrical contacts. The body 101 may provide a power state of the display apparatus 100 to the adapter 200, and the adapter 200 may determine whether to provide the high-voltage power depending on the power state of the display apparatus 100. In addition, the body 101, which receives the high-voltage power, may provide the feedback signal to the adapter 200 in response to receiving the high-voltage power.

Further, since the adapter 200 and the body 101 are coupled by the magnetic interaction between the primary coil 221 in the adapter 200 and the secondary coil 231 in the body 101, the safety accident of the user may be prevented and the power transmission efficiency may be increased.

According to the related art, in a conventional display apparatus including a conventional detachable adapter, power is supplied to the display apparatus by an electrical contact between the adapter and a body.

According to the international standards, an output voltage of the adapter is limited to 60 V to prevent safety accidents. Accordingly, the adapter steps down a voltage of power supplied from an external AC power source to 60 V and transmits the stepped down voltage to the body of the display apparatus. As the display apparatus is becoming larger in size, power consumed by the display apparatus has been increased, and accordingly, current supplied from the adapter to the body has been increased. Due to the increased current, power loss due to a cable extending from the adapter to the body may be increased. In order to prevent the power loss, a thickness of the cable is inevitably increased.

In comparison with this, in the display apparatus 100 according to an embodiment, since the terminals for transmitting the high-voltage power are not exposed to the outside, it is possible to increase the voltage of the power passing through the power cable 200a regardless of the international standards. Accordingly, a magnitude of the current flowing along the power cable 200a may be decreased, and a thickness of the power cable 200a may be reduced.

According to the international standards, when the supply of the power is cut off while the adapter is separated from the body, the output voltage of the adapter is not limited. Using this, the adapter may transmit the power supplied from the external AC power source to the body of the display apparatus as it is. However, since contact terminals of the adapter and the body are exposed to the outside, an insulation-type DC-DC converter is required for each of the adapter and the body in order to prevent electric shock due to electric charges accumulated in the adapter or the body. As a result, the thickness of the display apparatus 100 may be increased.

In comparison with this, in the display apparatus 100 according to an embodiment, since an insulation-type DC-DC converter required for each of the adapter and the body is omitted, most of the power components, which are large in volume, are provided in the adapter 200, and only the secondary coil 231, the second magnetic core 232, and the second rectifier 241 are provided in the body 101, the thickness of the body 101 of the display apparatus 100 may be reduced.

As such, the transformer T used for power conversion may be separated and disposed in the adapter 200 and the body 101. Specifically, the primary coil 221 and the first magnetic core 222 of the transformer T may be disposed in the adapter 200, and the secondary coil 231 and the second magnetic core 232 of the transformer T may be disposed in the body 101. In addition, the primary coil 221 and the first magnetic core 222 may be magnetically interconnected with the secondary coil 231 and the second magnetic core 232 without electrical/mechanical/direct contacts, and may magnetically transmit power to the secondary coil 231 and the second magnetic core 232.

The adapter 200 and the body 101 may be electrically and/or magnetically connected through the adapter connector 220 and the body connector 230. The structure or the like of the adapter connector 220 and the body connector 230 will be described in detail below.

Figure 6:
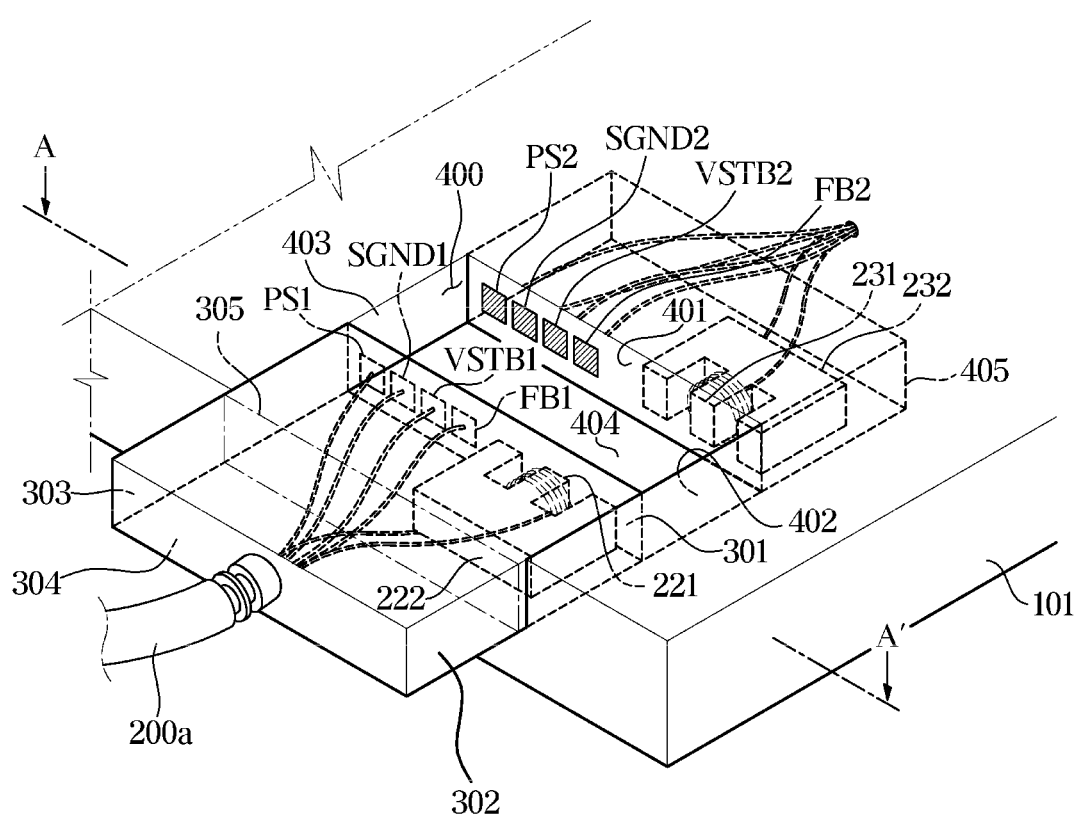
FIG. 6 illustrates a body and an adapter of a display apparatus according to an embodiment.
Figure 7:
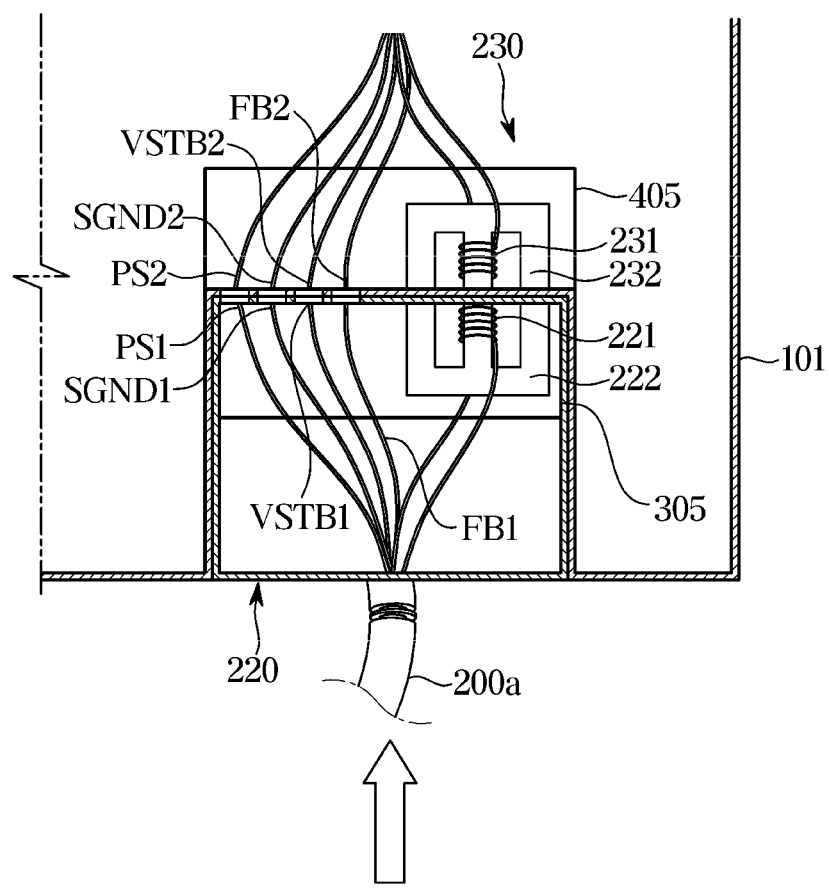
FIG. 7 illustrates a cross section taken along line A-A' shown in FIG. 6.

FIG. 6 illustrates a body and an adapter of a display apparatus according to an embodiment. FIG. 7 illustrates a cross section taken along line A-A' shown in FIG. 6.

As shown in FIG. 6, a primary coil 221 and a first magnetic core 222 may be provided inside an adapter connector 220, and a plurality of electric contacts PS1, SGND1, VSTB1, and FB1 may be provided on a surface of the adapter connector 220. In addition, a secondary coil 231 and a second magnetic core 232 may be accommodated in a body 101, and a plurality of electric contacts PS2, SGND2, VSTB2, and FB2 may be provided on a surface of the body 101. The secondary coil 231, the second magnetic core 232, and the plurality of electric contacts PS2, SGND2, VSTB2, and FB2 may constitute the body connector 230.

The adapter connector 220 may be inserted into a connector concave portion 400 provided in, for example, a rear surface of the body 101. The adapter connector 220 may be inserted into the connector concave portion 400 from a lower side to an upper side on the basis of the arrangement of the display apparatus 100.

The adapter connector 220 may have a substantially rectangular parallelepiped shape as shown in FIGS. 6 and 7. The adapter connector 220 includes a first adapter surface 301 facing the body 101, a second adapter surface 302 and a third adapter surface 303 on both sides of the adapter connector 220, and a fourth adapter surface 304 facing the front on the basis of the arrangement of the display apparatus 100.

In the connector concave portion 400 of the body 101, a first concave surface 401 facing the first adapter surface 301 of the adapter connector 220, a second concave surface 402 and a third concave surface 403 facing the second adapter surface 302 and the third adapter surface 303 of the adapter connector 220, respectively, and a fourth concave surface 404 facing the fourth adapter surface 304 of the adapter connector 220 are formed.

The first adapter surface 301 may be provided on a front surface of the adapter connector 220 on the basis of a direction D1 in which the adapter connector 220 is inserted into the connector concave portion 400. When the adapter connector 220 is inserted into the connector concave portion 400, the first adapter surface 301 may face the first concave surface 401 of the connector concave portion 400.

On the first adapter surface 301, a first adapter contact PS1, a second adapter contact SGND1, a third adapter contact VSTB1, and a fourth adapter contact FB1 are provided. In addition, in the first magnetic core 222 having an English letter "E" shape, three legs of an English letter "E" may be disposed to face the first adapter surface 301 of the adapter connector 220. In addition, the primary coil 221 is wound around a center leg of the three legs of the first magnetic core 222. Accordingly, an alternating magnetic field induced by the primary coil 221 may be generated in the first magnetic core 222 toward the first adapter surface 301 of the adapter connector 220.

On the first concave surface 401, a first body contact PS2, a second body contact SGND2, a third body contact VSTB2, and a fourth body contact FB2 are provided. In addition, in the second magnetic core 232 having an English letter "E" shape, three legs of an English letter "E" may be disposed to face the first concave surface 401 of the connector concave portion 400. In addition, the secondary coil 231 is wound around a center leg of the three legs of the second magnetic core 232. Accordingly, the alternating magnetic field generated by the first magnetic core 222 may pass through the first adapter surface 301 and the first concave surface 401 provided in the direction D1 in which the adapter connector 220 is inserted, and may be transmitted to the second magnetic core 232.

As such, the first magnetic core 222 may not be exposed to the outside due to the adapter connector 220, and the second magnetic core 232 may not be exposed to the outside due to the body 101. Accordingly, high-voltage power transmitted and received between the primary coil 221 and the secondary coil 231 may be prevented from leaking to the outside through the first magnetic core 222 and the second magnetic core 232.

However, in order to minimize an air gap between the first magnetic core 222 and the second magnetic core 232, at least a portion of the first magnetic core 222 and at least a portion of the second magnetic core 232 may be exposed out of the adapter connector 220 and the body 101, but the exposed portion may be coated with a resin or the like for insulation. In addition, by using the reinforced insulated primary coil 221 and secondary coil 231, the high-voltage power transmitted and received between the primary coil 221 and the secondary coil 231 may be prevented from leaking to the outside through the first magnetic core 222 and the second magnetic core 232.

Due to the air gap between the first magnetic core 222 and the second magnetic core 232, a portion of the magnetic field transmitted from the first magnetic core 222 to the second magnetic core 232 may leak. The magnetic field leaked as described above may induce electromagnetic interference in other electrical portions provided in the body 101.

In order to block the leaked magnetic field, a first metal structure 305 surrounding the first magnetic core 222 is provided in the adapter connector 220. For example, the first metal structure 305 surrounding the side surfaces 301, 302, 303, and 304 of the adapter connector 220 is provided on an exterior of the adapter connector 220. In addition, a second metal structure 405 surrounding the second magnetic core 232 may be provided in the body connector 230. The second metal structure 405 surrounding the side surfaces of the second magnetic core 232 is provided.

Although all of the first metal structure 305 and the second metal structure 405 are illustrated in FIG. 6, any one of the first metal structure 305 and the second metal structure 405 may be omitted as needed.

The second adapter surface 302 and the third adapter surface 303 of the adapter connector 220 are provided on both sides of the adapter connector 220. For example, on the basis of the arrangement of the display apparatus 100, the second adapter surface 302 may be provided on a left side of the adapter connector 220, and the third adapter surface 303 may be provided on a right side of the adapter connector 220.

The second concave surface 402 and the third concave surface 403 of the connector concave portion 400 may be provided to face the second adapter surface 302 and the third adapter surface 303 of the adapter connector 220, respectively. While the adapter connector 220 is inserted, the second adapter surface 302 of the adapter connector 220 may move while scraping the second concave surface 402 of the connector concave portion 400.

The fourth adapter surface 304 of the adapter connector 220 may be provided adjacent to the first adapter surface 301, the second adapter surface 302, and the third adapter surface 303 of the adapter connector 220. For example, the fourth adapter surface 304 may be provided in a front side of the adapter connector 220 on the basis of the arrangement of the display apparatus 100.

The fourth concave surface 404 of the connector concave portion 400 may be provided to face the fourth adapter surface 304 of the adapter connector 220. When the adapter connector 220 is inserted, the fourth adapter surface 304 of the adapter connector 220 may be brought into contact with the fourth concave surface 404 of the connector concave portion 400.

As shown in FIG. 7, when the adapter connector 220 is inserted into the connector concave portion 400 of the body 101, the adapter 200 may be electrically and/or magnetically connected to the body 101. For example, the first adapter contact PS1 of the adapter connector 220 may be electrically connected to the first body contact PS2 of the body connector 230. The second adapter contact SGND1 may be electrically connected to the second body contact SGND2. The third adapter contact VSTB1 may be electrically connected to the third body contact VSTB2. The fourth adapter contact FB1 may be electrically connected to the fourth body contact FB2.

Further, the primary coil 221 of the adapter connector 220 may be magnetically connected to the secondary coil 231 through the first magnetic core 222 and the second magnetic core 232. The alternating magnetic field induced by the primary coil 221 may pass through the air gap from the first magnetic core 222 to be transmitted to the second magnetic core 232. The alternating magnetic field of the second magnetic core 232 may induce an AC current in the secondary coil 231.

Figure 8:
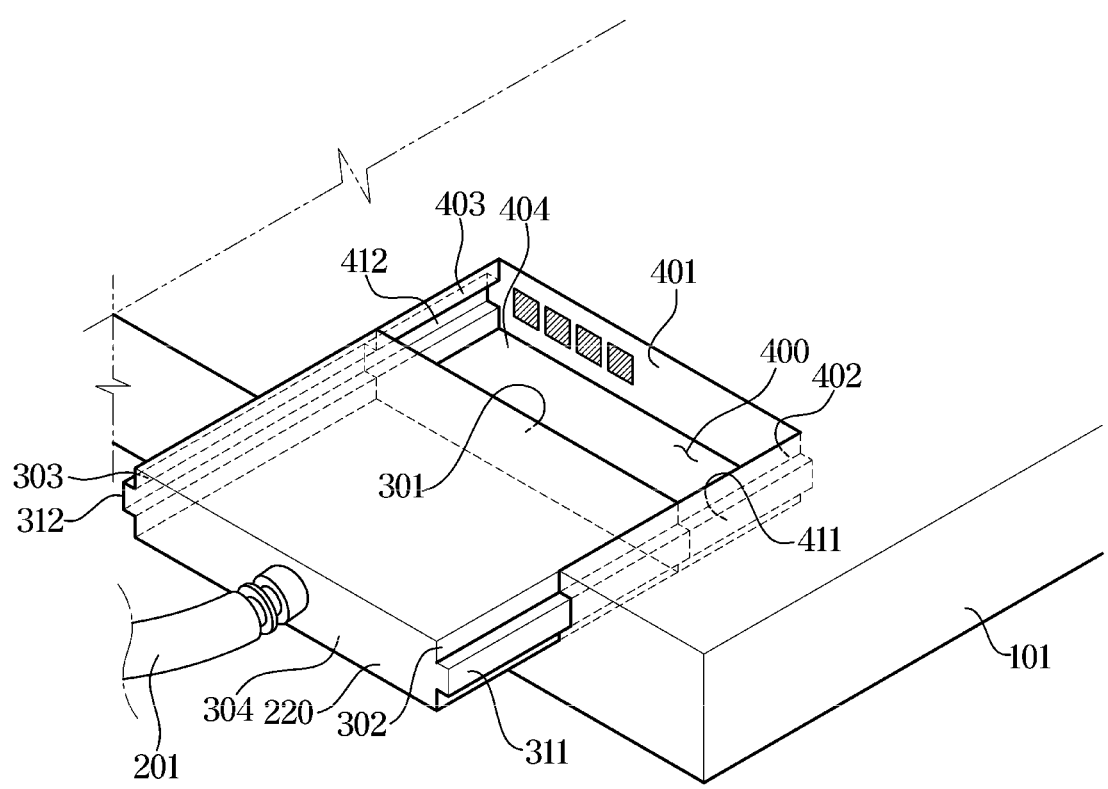
FIG. 8 illustrates a body and an adapter of a display apparatus according to an embodiment.

FIG. 8 illustrates a body and an adapter of a display apparatus according to an embodiment.

As shown in FIG. 8, an adapter connector 220 includes a first adapter surface 301, a second adapter surface 302, a third adapter surface 303, and a fourth adapter surface 304, a primary coil 221 and a first magnetic core 222 are provided in the adapter connector 220, and a plurality of electric contacts PS1, SGND1, VSTB1, and FB1 are provided on the first adapter surface 301.

The adapter connector 220 may be inserted into a connector concave portion 400 of a body 101, which includes a first concave surface 401, a second concave surface 402, a third concave surface 403, and a fourth concave surface 404. A secondary coil 231 and a second magnetic core 232 may be provided in the body 101, and a plurality of electric contacts PS2, SGND2, VSTB2, and FB2 may be provided on the first concave surface 401.

In order to be electrically and/or magnetically connected to the body 101, the adapter connector 220 may be inserted into the connector concave portion 400 in a predetermined direction D1.

When the first magnetic core 222 is not aligned with the second magnetic core 232, transmission efficiency for transferring power from an adapter 200 to the body 101 may be reduced. For example, a portion of a magnetic field emitted from the first magnetic core 222 to an air gap may not be transmitted to the second magnetic core 232 and may be leaked. When the first magnetic core 222 is not aligned with the second magnetic core 232, the intensity of the leaked magnetic field may be increased. Accordingly, transmission efficiency of AC power transmitted from the primary coil 221 to the secondary coil 231 may be reduced, and finally, the transmission efficiency for transmitting power from the adapter 200 to the body 101 may be reduced.

In order to align the first magnetic core 222 with the second magnetic core 232, guide protrusions 311 and 312 may be provided in the adapter connector 220, and guide grooves 411 and 412 may be provided in the connector concave portion 400.

The guide protrusions 311 and 312 may include a first guide protrusion 311 provided on the second adapter surface 302 of the adapter connector 220 and a second guide protrusion 312 provided on the third adapter surface 303. The guide protrusions 311 and 312 may extend in the direction D1, in which the adapter connector 220 is inserted into the connector concave portion 400, on the second adapter surface 302 and the third adapter surface 303, respectively.

The guide grooves 411 and 412 may include a first guide groove 411 provided in the second concave surface 402 of the adapter connector 220 and a second guide groove 412 provided in the third concave surface 403. The guide grooves 411 and 412 may extend in the direction D1, in which the adapter connector 220 is inserted into the connector concave portion 400, in the second concave surface 402 and the third concave surface 403, respectively.

The adapter connector 220 may be disposed in the connector concave portion 400 such that the first guide protrusion 311 is inserted into the first guide groove 411, and the second guide protrusion 312 is inserted into the second guide groove 412. Thereafter, the adapter connector 220 may be inserted into the connector concave portion 400.

The guide protrusions 311 and 312 and the guide grooves 411 and 412 may be disposed such that the first magnetic core 222 is aligned with the second magnetic core 232. Accordingly, when the first adapter surface 301 of the adapter connector 220 is brought into contact with the first concave surface 401 of the connector concave portion 400, the first magnetic core 222 is aligned with the second magnetic core 232, and the leakage of the magnetic field between the first magnetic core 222 and the second magnetic core 232 may be minimized.

The arrangement of the guide protrusions and the guide grooves is not limited to those shown in FIG. 8. For example, the guide grooves may be provided in the adapter connector 220 and the guide protrusions may be provided in the connector concave portion 400.

Figure 9:
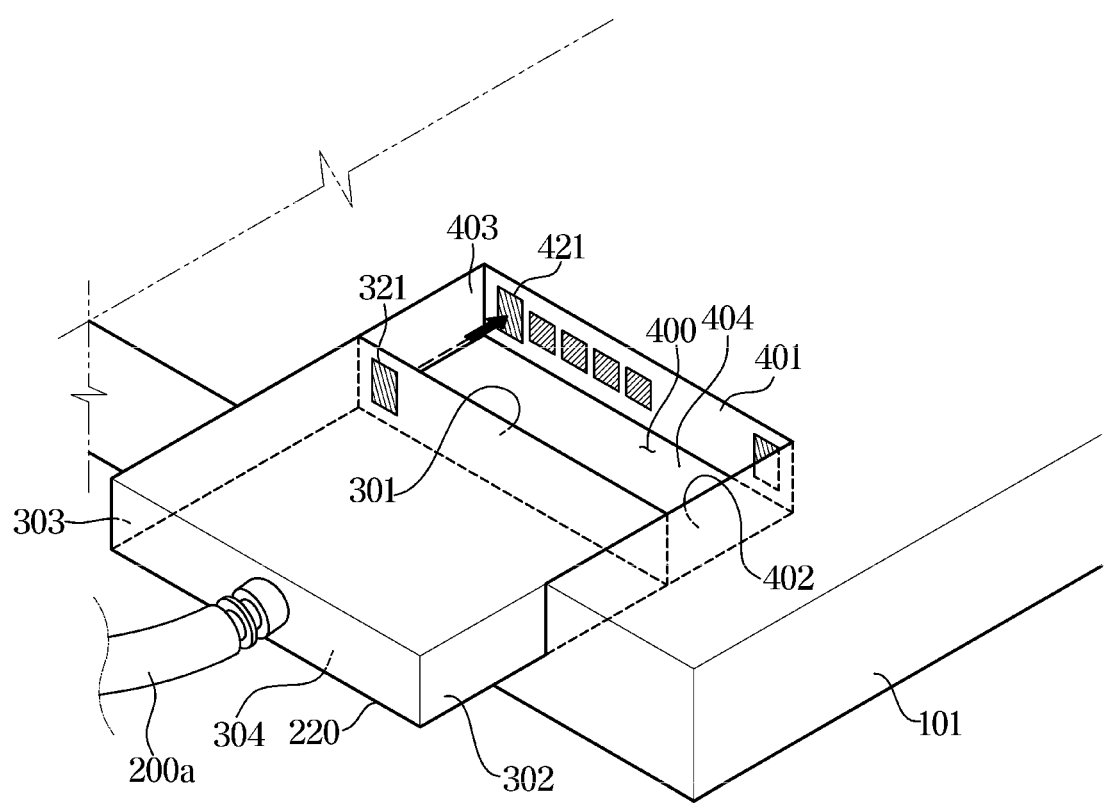
FIG. 9 illustrates a body and an adapter of a display apparatus according to an embodiment.

FIG. 9 illustrates a body and an adapter of a display apparatus according to an embodiment.

As shown in FIG. 9, an adapter connector 220 may include a first adapter surface 301, a second adapter surface 302, a third adapter surface 303, and a fourth adapter surface 304, and may be inserted into a connector concave portion 400 of a body 101, which includes a first concave surface 401, a second concave surface 402, a third concave surface 403, and a fourth concave surface 404. A primary coil 221 and a first magnetic core 222 are provided inside the adapter connector 220, and a secondary coil 231 and a second magnetic core 232 are provided inside the body 101.

In order to align the first magnetic core 222 with the second magnetic core 232, a first guide magnet 321 may be provided in the adapter connector 220, and a second guide magnet 421 may be provided in the connector concave portion 400. For example, the first guide magnet 321 may be provided on the first adapter surface 301 of the adapter connector 220, and the second guide magnet 421 may be provided on the first concave surface 401 of the connector concave portion 400.

The first guide magnet 321 may have a polarity different from that of the second guide magnet 421. For example, when the polarity of an exposed portion of the first guide magnet 321 is an N-pole, the polarity of an exposed portion of the second guide magnet 421 may be an S-pole. In addition, when the polarity of the exposed portion of the first guide magnet 321 is an S-pole, the polarity of the exposed portion of the second guide magnet 421 may be an N-pole.

The first guide magnet 321 and the second guide magnet 421 may be disposed such that the first magnetic core 222 is aligned with the second magnetic core 232 when the first guide magnet 321 is brought into contact with the second guide magnet 421. Accordingly, when the first adapter surface 301 of the adapter connector 220 approaches the first concave surface 401 of the connector concave portion 400, the adapter connector 220 may be disposed in the connector concave portion 400 such that the first guide magnet 321 is brought into contact with the second guide magnet 421, and the first magnetic core 222 may be aligned with the second magnetic core 232. Accordingly, the leakage of a magnetic field between the first magnetic core 222 and the second magnetic core 232 may be minimized.

Figure 10:
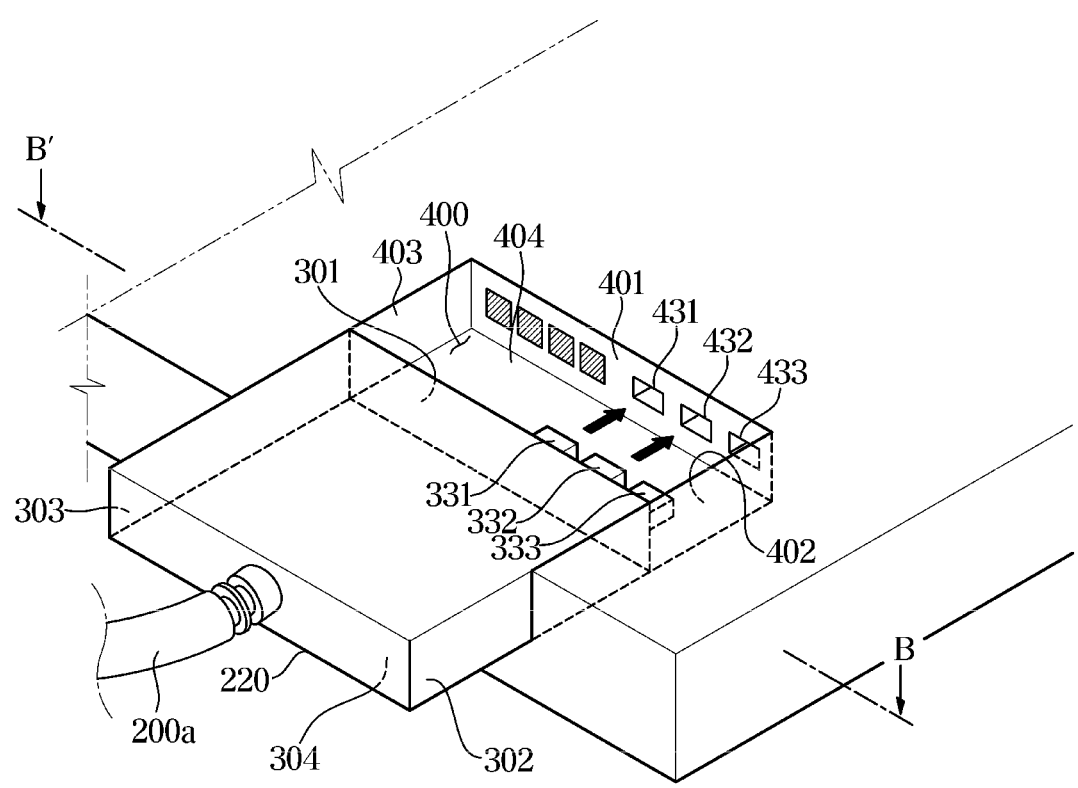
FIG. 10 illustrates a body and an adapter of a display apparatus according to an embodiment.
Figure 11:
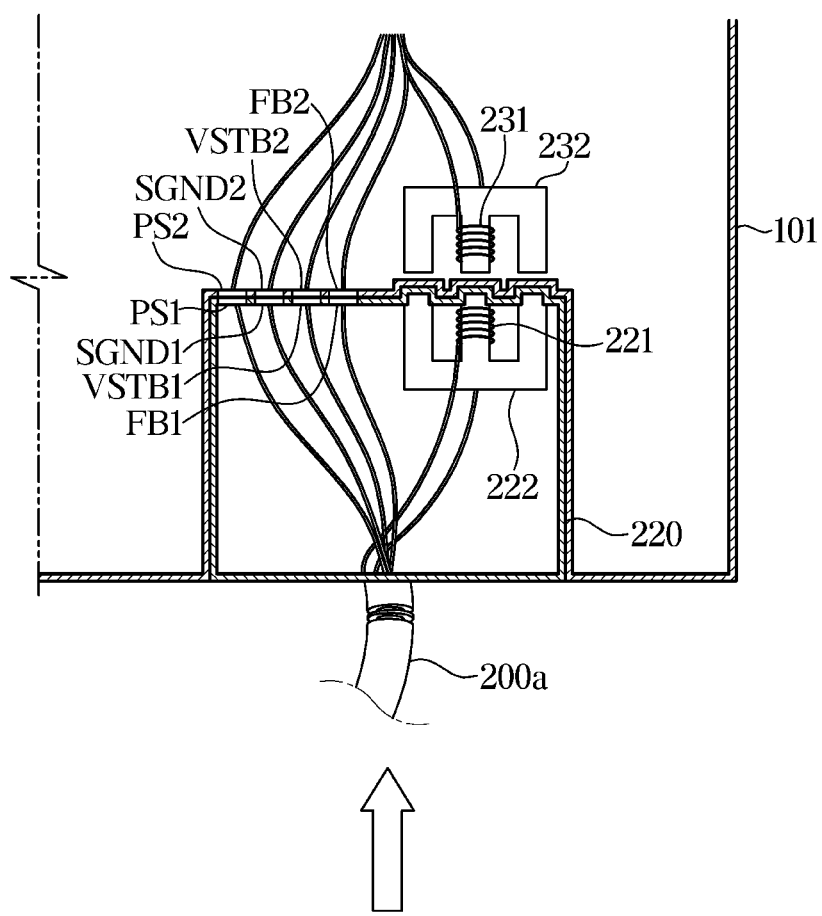
FIG. 11 illustrates a cross section taken along line B-B' shown in FIG. 10.

FIG. 10 illustrates a body and an adapter of a display apparatus according to an embodiment. FIG. 11 illustrates a cross section taken along line B-B' shown in FIG. 10.

As shown in FIG. 10, an adapter connector 220 may include a first adapter surface 301, a second adapter surface 302, a third adapter surface 303, and a fourth adapter surface 304, and may be inserted into a connector concave portion 400 of a body 101, which includes a first concave surface 401, a second concave surface 402, a third concave surface 403, and a fourth concave surface 404. A primary coil 221 and a first magnetic core 222 are provided inside the adapter connector 220, and a secondary coil 231 and a second magnetic core 232 are provided inside the body 101.

In order to align the first magnetic core 222 with the second magnetic core 232, insertion protrusions 331, 332, and 333 are provided on the first adapter surface 301 of the adapter connector 220, and insertion grooves 431, 432, and 433 are provided in the first concave surface 401 of the connector concave portion 400.

The insertion protrusions 331, 332, and 333 may include a first insertion protrusion 331, a second insertion protrusion 332, and a third insertion protrusion 333, and the insertion grooves 431, 432, and 433 may include a first insertion groove 431, a second insertion groove 432, and a third insertion groove 433. As such, the number of the insertion protrusions 331, 332, and 333 may be the same as the number of protrusions formed in the first magnetic core 222 having an English letter "E" shape, and the number of the insertion grooves 431, 432, and 433 may be the same as the number of protrusions formed in the second magnetic core 232 having an English letter "E" shape.

As shown in FIG. 11, the insertion protrusions 331, 332, and 333 may each have a size to allow the protrusions of the first magnetic core 222 having the English letter "E" shape to be disposed inside the insertion protrusions 331, 332, and 333, respectively. In other words, the insertion protrusions 331, 332, and 333 may have a shape in which an exterior of the adapter connector 220 is coated on the protrusions of the first magnetic core 222. In addition, the insertion grooves 431, 432, and 433 may each have a size to allow the insertion protrusions 331, 332, and 333 to be inserted into the insertion grooves 431, 432, and 433, respectively.

The insertion protrusions 331, 332, and 333 and the insertion grooves 431, 432, and 433 may be disposed such that the first magnetic core 222 is aligned with the second magnetic core 232 when the insertion protrusions 331, 332, and 333 are inserted into the insertion grooves 431, 432, and 433, respectively. Accordingly, when the first adapter surface 301 of the adapter connector 220 approaches the first concave surface 401 of the connector concave portion 400, as shown in FIG. 11, the insertion protrusions 331, 332, and 333 of the adapter connector 220 may be inserted into the insertion grooves 431, 432, and 433 of the connector concave portion 400, respectively, and the first magnetic core 222 may be aligned with the second magnetic core 232.

In particular, as shown in FIG. 11, the protrusions of the first magnetic core 222 may also be inserted into the insertion grooves 431, 432, and 433 together with the insertion protrusions 331, 332, and 333, respectively, and thus a separation distance between the first magnetic core 222 and the second magnetic core 232 may be minimized. Accordingly, the leakage of a magnetic field between the first magnetic core 222 and the second magnetic core 232 may be minimized.

The arrangement of the insertion protrusions and the insertion grooves is not limited to those shown in FIGS. 10 and 11. For example, the insertion grooves may be provided in the adapter connector 220 and the insertion protrusions may be provided in the connector concave portion 400.

Figure 12:
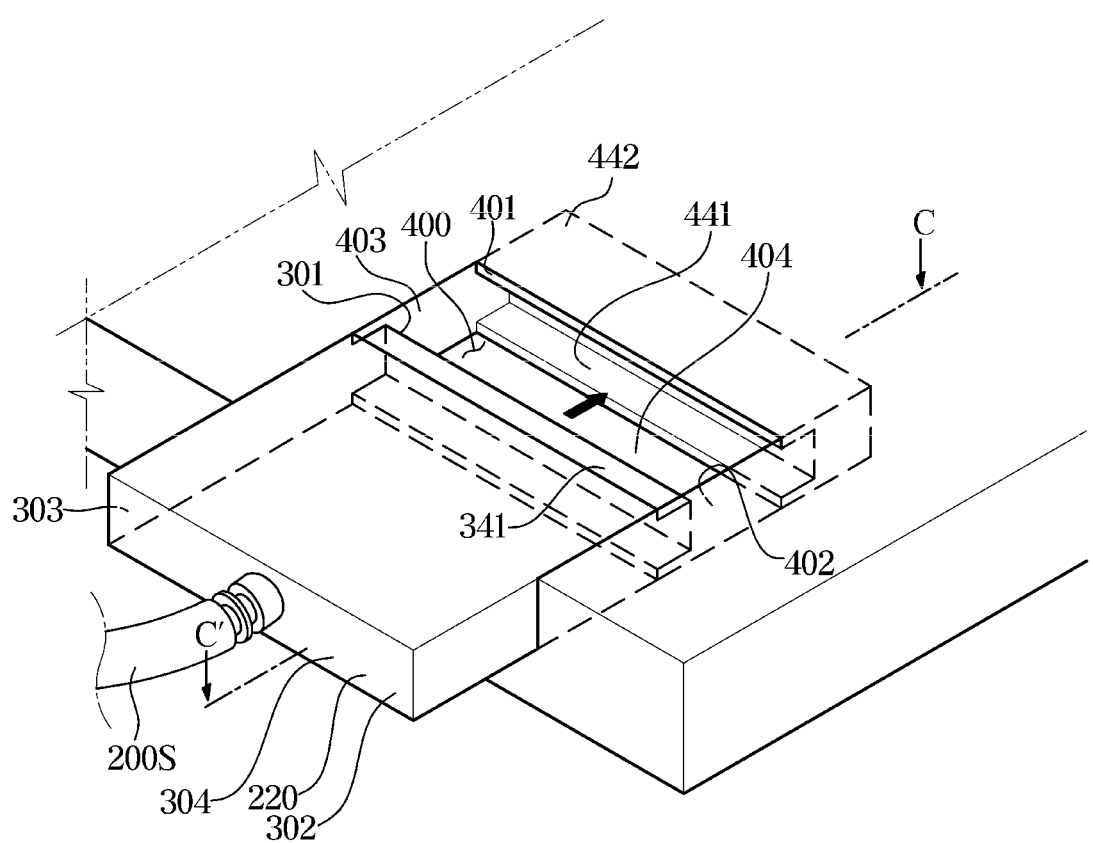
FIG. 12 illustrates a body and an adapter of a display apparatus according to an embodiment.
Figure 13:
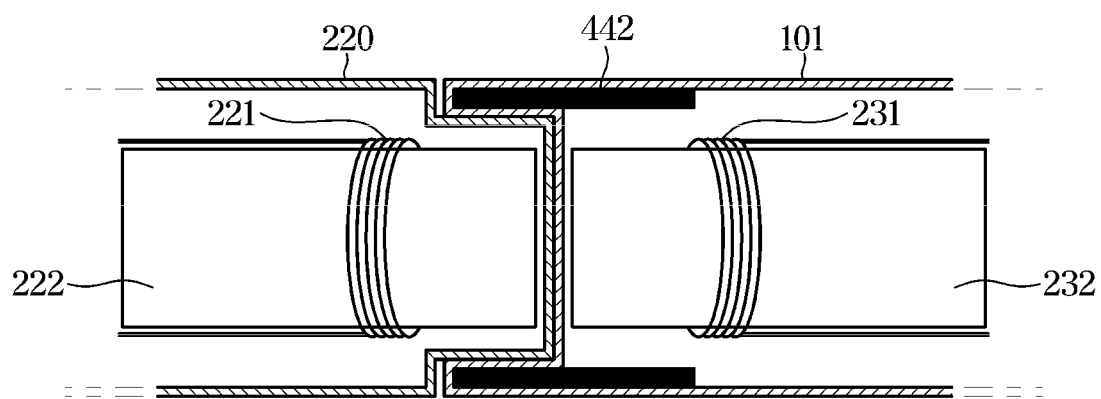
FIG. 13 illustrates a cross section taken along line C-C' shown in FIG. 12.

FIG. 12 illustrates a body and an adapter of a display apparatus according to an embodiment. FIG. 13 illustrates a cross section taken along line C-C' shown in FIG. 12.

As shown in FIG. 12, an adapter connector 220 may include a first adapter surface 301, a second adapter surface 302, a third adapter surface 303, and a fourth adapter surface 304, and may be inserted into a connector concave portion 400 of a body 101, which includes a first concave surface 401, a second concave surface 402, a third concave surface 403, and a fourth concave surface 404. A primary coil 221 and a first magnetic core 222 are provided inside the adapter connector 220, and a secondary coil 231 and a second magnetic core 232 are provided inside the body 101.

In order to align the first magnetic core 222 with the second magnetic core 232, an insertion protrusion 341 is provided on the first adapter surface 301 of the adapter connector 220, and an insertion groove 441 is provided in the first concave surface 401 of the connector concave portion 400.

The insertion protrusion 341 may extend from a corner of the adapter connector 220, at which the first adapter surface 301 is in contact with the second adapter surface 302, to a corner of the adapter connector 220, at which the first adapter surface 301 is in contact with the third adapter surface 303. In other words, the insertion protrusion 341 may be provided to be elongated in a transverse direction on the first adapter surface 301 of the adapter connector 220.

The insertion groove 441 may extend from a corner of the connector concave portion 400, at which the first concave surface 401 is in contact with the second concave surface 402, to a corner of the connector concave portion 400, at which the first concave surface 401 is in contact with the third concave surface 403. In other words, the insertion groove 441 may be provided to be elongated in the transverse direction in the first concave surface 401 of the connector concave portion 400.

As shown in FIG. 13, the insertion protrusion 341 may have a size to allow a portion of the first magnetic core 222 to be disposed inside the insertion protrusion 341. In addition, the insertion groove 441 may have a size to allow the insertion protrusion 341 to be inserted into the insertion groove 441.

The insertion protrusion 341 and the insertion groove 441 may be disposed such that the first magnetic core 222 is aligned with the second magnetic core 232 when the insertion protrusion 341 is inserted into the insertion groove 441. Accordingly, when the first adapter surface 301 of the adapter connector 220 approaches the first concave surface 401 of the connector concave portion 400, as shown in FIG. 13, the insertion protrusion 341 of the adapter connector 220 and a portion of the first magnetic core 222 may be inserted into the insertion groove 441 of the connector concave portion 400, and the first magnetic core 222 may be aligned with the second magnetic core 232.

In addition, portions protruding due to the insertion groove 441 are formed at upper and lower sides of the insertion groove 441. A metal structure 442 for blocking a magnetic field leaking from an air gap between the first magnetic core 222 and the second magnetic core 232 may be located inside the portion protruding due to the insertion groove 441. In particular, as shown in FIG. 13, the metal structure 442 may overlap the air gap between the first magnetic core 222 and the second magnetic core 232, and may effectively block the magnetic field leaking from the air gap.

The arrangement of the insertion protrusion and the insertion groove is not limited to those shown in FIGS. 12 and 13. For example, the insertion groove may be provided in the adapter connector 220 and the insertion protrusion may be provided in the connector concave portion 400.

Figure 14:
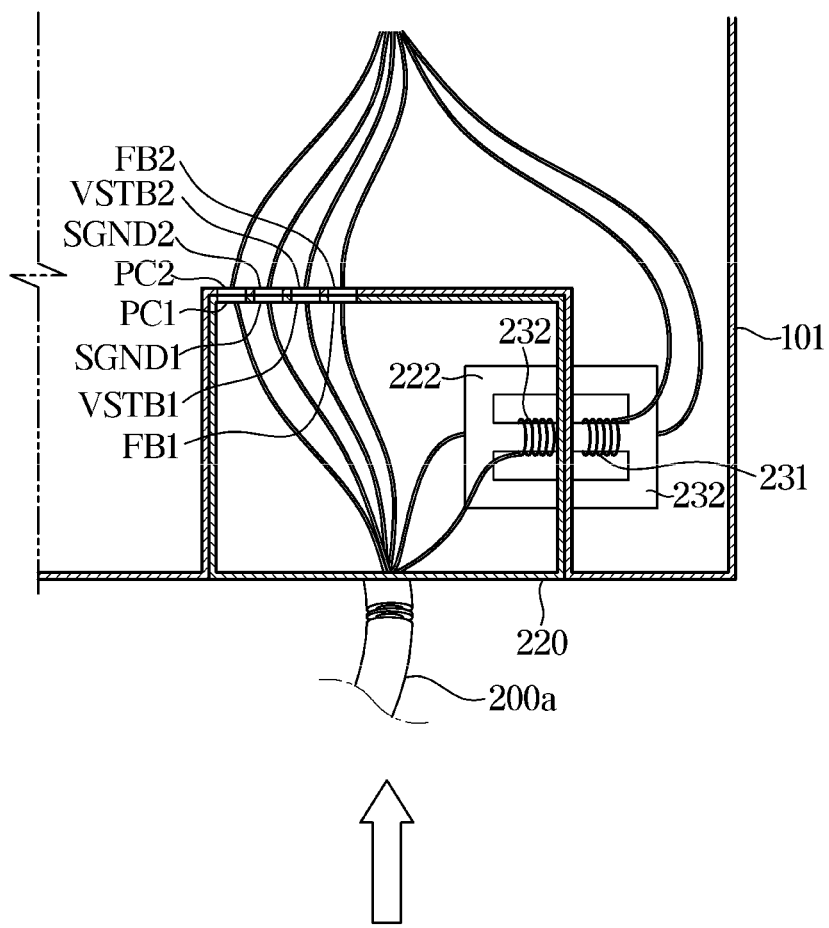
FIG. 14 illustrates a cross section of an adapter and a body of a display apparatus according to an embodiment when the adapter is connected to the body.

FIG. 14 illustrates a cross section of an adapter and a body of a display apparatus according to an embodiment when the adapter is connected to the body.

As shown in FIG. 14, an adapter connector 220 may include a first adapter surface 301, a second adapter surface 302, and a third adapter surface 303, and may be inserted into a connector concave portion 400 of a body 101, which includes a first concave surface 401, a second concave surface 402, and a third concave surface 403. A primary coil 221 and a first magnetic core 222 are provided inside the adapter connector 220, and a secondary coil 231 and a second magnetic core 232 are provided inside the body 101.

On the first adapter surface 301, a first adapter contact PS1, a second adapter contact SGND1, a third adapter contact VSTB1, and a fourth adapter contact FB1 are provided. In the first magnetic core 222 having an English letter "E" shape, three legs of an English letter "E" may be disposed to face the second adapter surface 302 that is a side surface of the adapter connector 220. In addition, the primary coil 221 is wound around a center leg of the three legs of the first magnetic core 222. Accordingly, an alternating magnetic field induced by the primary coil 221 may be generated in the first magnetic core 222 toward the second adapter surface 302 of the adapter connector 220.

On the first concave surface 401, a first body contact PS2, a second body contact SGND2, a third body contact VSTB2, and a fourth body contact FB2 are provided. In the second magnetic core 232 having an English letter "E" shape, three legs of an English letter "E" may be disposed to face the second concave surface 402 that is a side surface of the connector concave portion 400. In addition, the secondary coil 231 is wound around a center leg of the three legs of the second magnetic core 232. Accordingly, the alternating magnetic field generated by the first magnetic core 222 may pass through the second adapter surface 302 and the second concave surface 402, which are perpendicular to a direction D1 in which the adapter connector 220 is inserted, and may be transmitted to the second magnetic core 232.

With the arrangement shown in FIG. 14, an air gap between the first magnetic core 222 and the second magnetic core 232 may be spaced apart from the plurality of contacts PS1, SGND1, VSTB1, FB1, PS2, SGND2, VSTB2, and FB2, and a phenomenon in which noise is generated in signals transmitted through the plurality of contacts PS1, SGND1, VSTB1, FB1, PS2, SGND2, VSTB2, and FB2 due to a magnetic field leaking from the air gap may be prevented.

Figure 15:
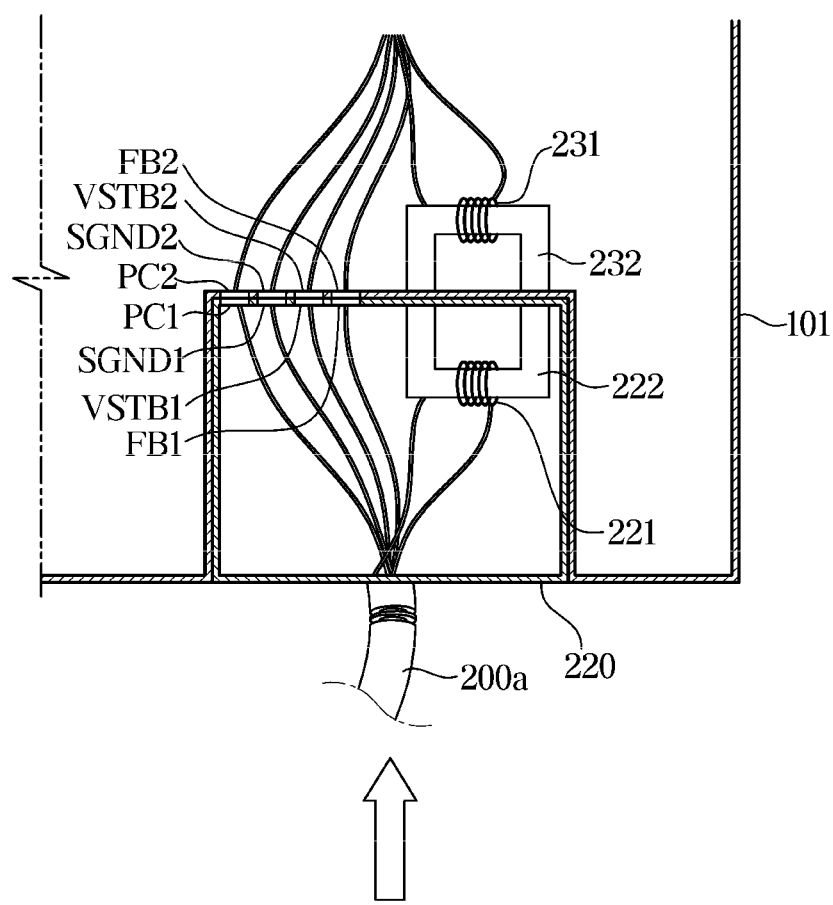
FIG. 15 illustrates a cross section of an adapter and a body of a display apparatus according to an embodiment when the adapter is connected to the body.

FIG. 15 illustrates a cross section of an adapter and a body of a display apparatus according to an embodiment when the adapter is connected to the body.

As shown in FIG. 15, an adapter connector 220 may include a first adapter surface 301, a second adapter surface 302, and a third adapter surface 303, and may be inserted into a connector concave portion 400 of a body 101, which includes a first concave surface 401, a second concave surface 402, and a third concave surface 403. A primary coil 221 and a first magnetic core 222 having an English letter "U" shape are provided inside the adapter connector 220, and a secondary coil 231 and a second magnetic core 232 having an English letter "U" shape are provided inside the body 101.

In the first magnetic core 222 having an English letter "U" shape, two legs of an English letter "U" may be disposed to face the first adapter surface 301 of the adapter connector 220. Accordingly, an alternating magnetic field induced by the primary coil 221 may be generated in the first magnetic core 222 toward the first adapter surface 301 of the adapter connector 220.

In the second magnetic core 232 having an English letter "U" shape, two legs of an English letter "U" may be disposed to face the first concave surface 401 that is a side surface of the connector concave portion 400. Accordingly, an alternating magnetic field generated by the first magnetic core 222 may pass through the first adapter surface 301 and the first concave surface 401 provided in a direction D1 in which the adapter connector 220 is inserted, and may be transmitted to the second magnetic core 232.

By the arrangement shown in FIG. 15, the first magnetic core 222 and the second magnetic core 232 may be easily fabricated.

Figure 16:
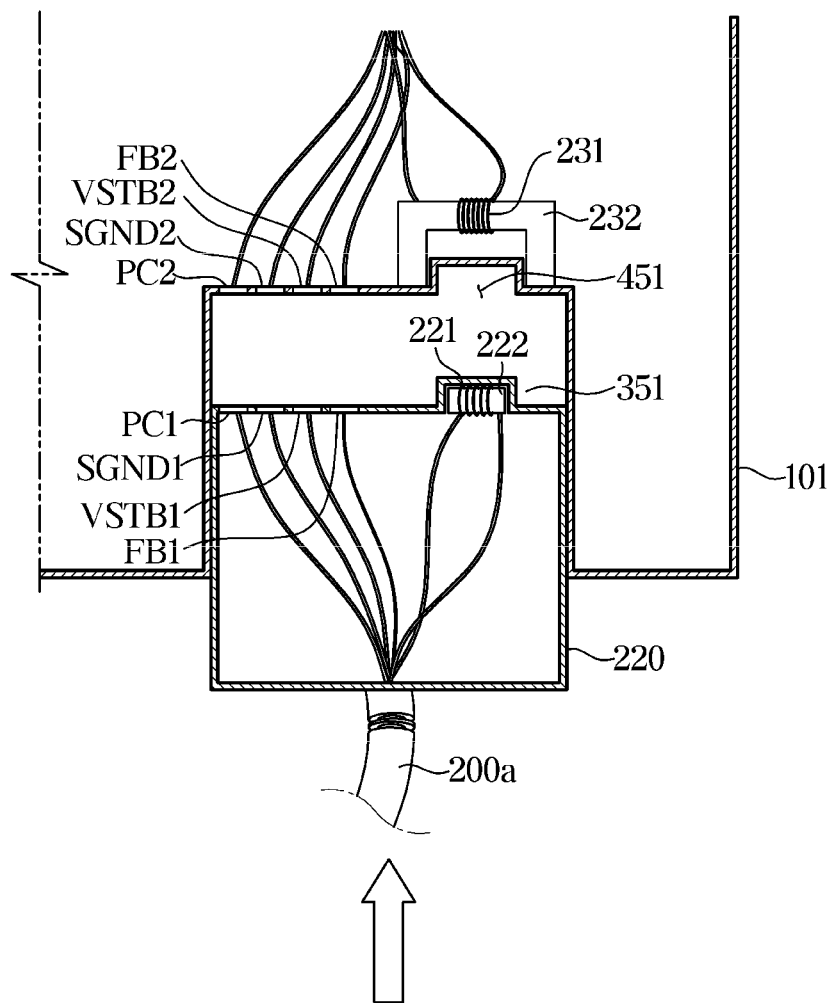
FIG. 16 illustrates a cross section of an adapter and a body of a display apparatus according to an embodiment when the adapter is connected to the body.

FIG. 16 illustrates a cross section of an adapter and a body of a display apparatus according to an embodiment when the adapter is connected to the body.

As shown in FIG. 16, an adapter connector 220 may include a first adapter surface 301, a second adapter surface 302, and a third adapter surface 303, and may be inserted into a connector concave portion 400 of a body 101, which includes a first concave surface 401, a second concave surface 402, and a third concave surface 403. A primary coil 221 and a first magnetic core 222 having an English letter "I" shape are provided inside the adapter connector 220, and a secondary coil 231 and a second magnetic core 232 having an English letter "U" shape are provided inside the body 101.

In order to align the first magnetic core 222 with the second magnetic core 232, an insertion protrusion 351 is provided on the first adapter surface 301 of the adapter connector 220, and an insertion groove 451 is provided in the first concave surface 401 of the connector concave portion 400.

The first magnetic core 222 having an English letter "I" shape is provided in a transverse direction in the insertion protrusion 351. In other words, the first magnetic core 222 may be disposed inside the insertion protrusion 351 such that a magnetic field is generated toward both side surfaces of the insertion protrusion 351 due to the primary coil 221.

In the second magnetic core 232 having an English letter "U" shape, two legs of an English letter "U" may be disposed to face the first concave surface 401 that is a side surface of the connector concave portion 400. In addition, an insertion groove 451 may be disposed between the two legs of the English letter "U." Accordingly, an alternating magnetic field generated by the first magnetic core 222 may pass through both side surfaces of the insertion protrusion 351 and both side surfaces of the insertion groove 451 to be transmitted to the second magnetic core 232.

The insertion protrusion 351 and the insertion groove 451 may be disposed such that the first magnetic core 222 having an English letter "I" shape is aligned with the second magnetic core 232 of an English letter "U" shape. Accordingly, when the insertion protrusion 351 is inserted into the insertion groove 451, the first magnetic core 222 may be aligned with the second magnetic core 232, and the leakage of the magnetic field between the first magnetic core 222 and the second magnetic core 232 may be minimized.

The arrangement of the insertion protrusion 351 and the insertion groove 451 and the shapes of the first magnetic core 222 and the second magnetic core 232 are not limited to those shown in FIG. 16. For example, in the adapter connector 220, a magnetic core having an English letter "U" shape may be provided, and an insertion groove may be formed. In addition, in the connector concave portion 400, a magnetic core having an English letter "I" shape may be provided, and an insertion protrusion may be formed.

Figure 17:
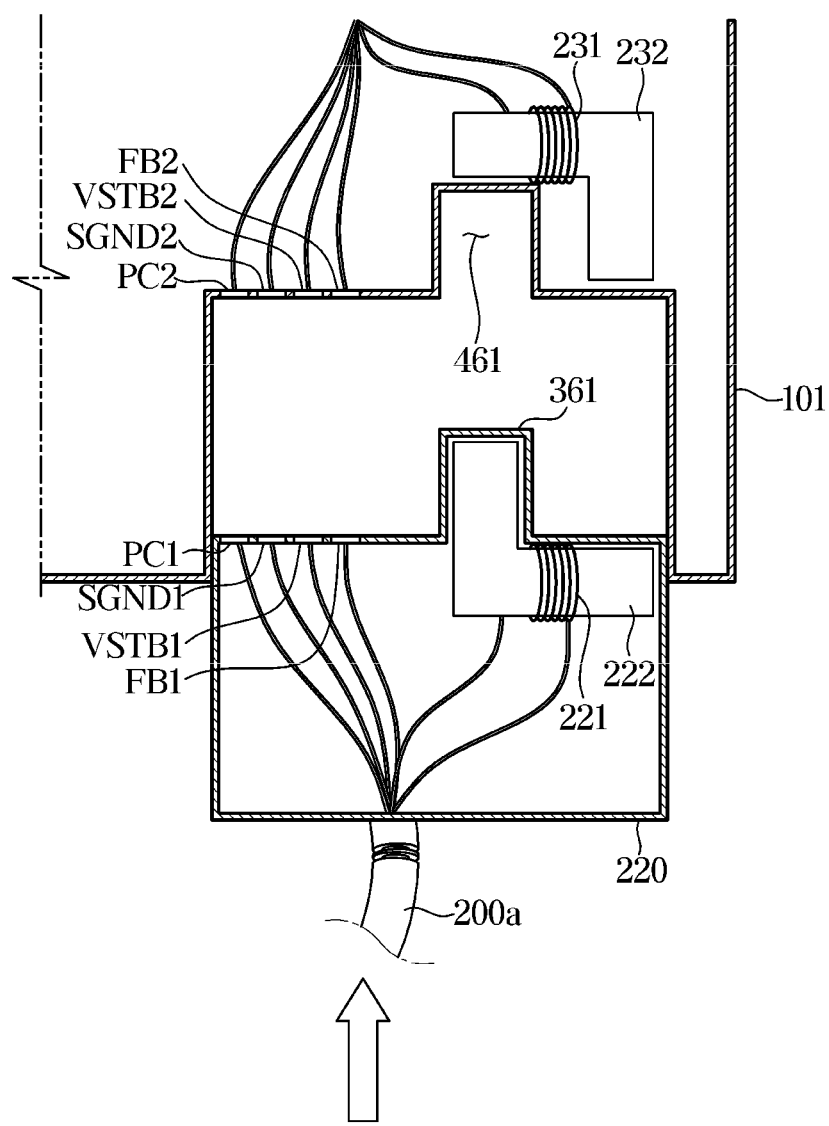
FIG. 17 illustrates a cross section of an adapter and a body of a display apparatus according to an embodiment when the adapter is connected to the body.

FIG. 17 illustrates a cross section of an adapter and a body of a display apparatus according to an embodiment when the adapter is connected to the body.

As shown in FIG. 17, an adapter connector 220 may include a first adapter surface 301, a second adapter surface 302, and a third adapter surface 303, and may be inserted into a connector concave portion 400 of a body 101, which includes a first concave surface 401, a second concave surface 402, and a third concave surface 403. A primary coil 221 and a first magnetic core 222 having an English letter "L" shape are provided inside the adapter connector 220, and a secondary coil 231 and a second magnetic core 232 having an English letter "L" shape are provided inside the body 101.

In order to align the first magnetic core 222 with the second magnetic core 232, an insertion protrusion 361 is provided on the first adapter surface 301 of the adapter connector 220, and an insertion groove 461 is provided in the first concave surface 401 of the connector concave portion 400.

The first magnetic core 222 having an English letter "L" shape may be provided inside the insertion protrusion 361, and the second magnetic core 232 having an English letter "L" shape may be provided at a protruding portion around the insertion groove 461.

The insertion protrusion 361 and the insertion groove 461 may be disposed such that the first magnetic core 222 having an English letter "L" shape is aligned with the second magnetic core 232 of an English letter "L" shape. Accordingly, when the insertion protrusion 361 is inserted into the insertion groove 461, the first magnetic core 222 may be aligned with the second magnetic core 232, and the leakage of a magnetic field between the first magnetic core 222 and the second magnetic core 232 may be minimized.

The arrangement of the insertion protrusion 361 and the insertion groove 461 and the shapes of the first magnetic core 222 and the second magnetic core 232 are not limited to those shown in FIG. 17. For example, the insertion groove may be formed in the adapter connector 220, and the insertion protrusion may be formed in the connector concave portion 400.

Figure 18:
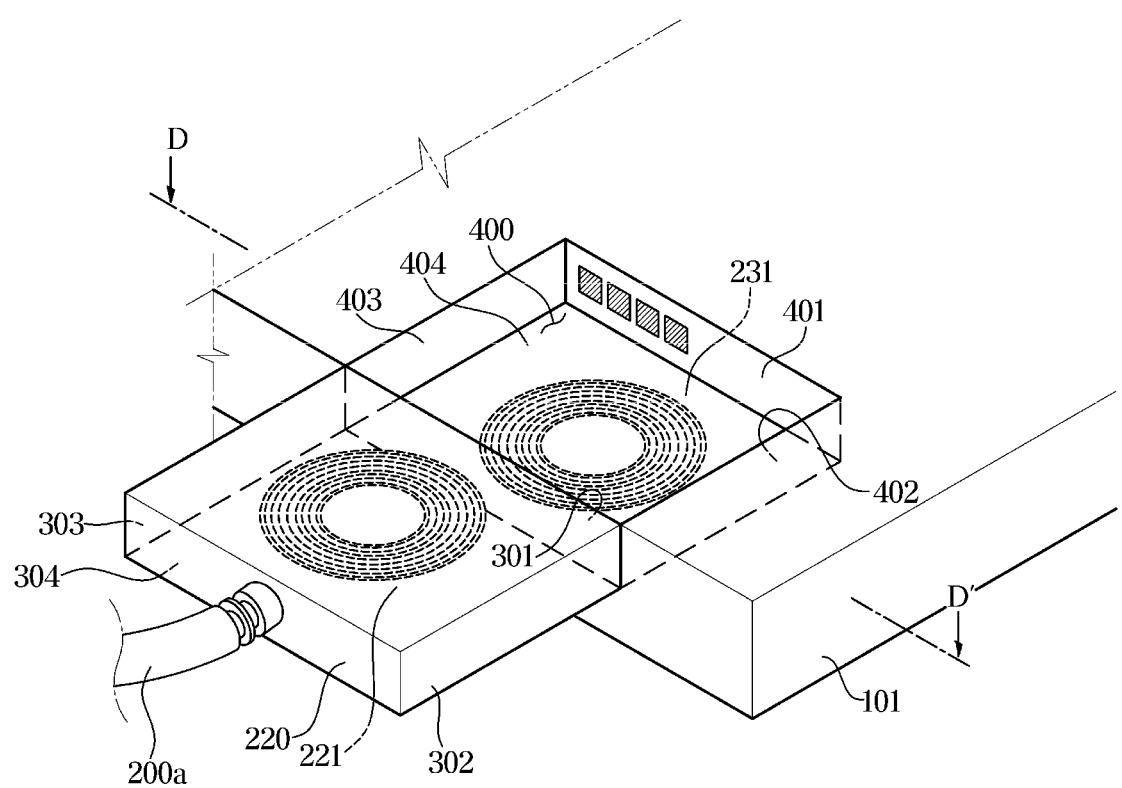
FIG. 18 illustrates a body and an adapter of a display apparatus according to an embodiment.
Figure 19:
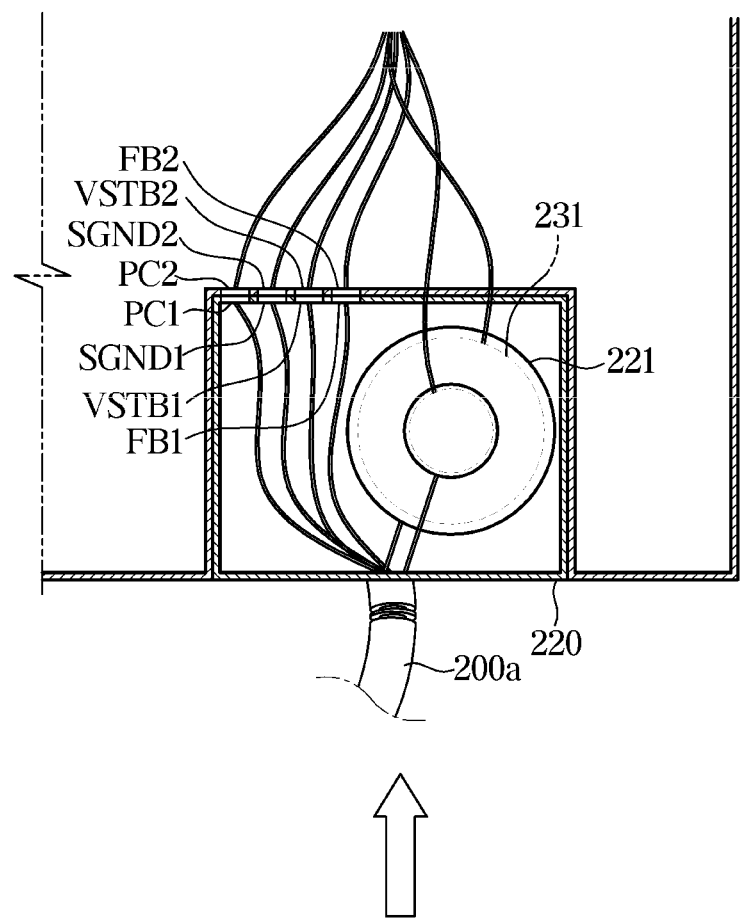
FIG. 19 illustrates a cross section taken along line D-D' shown in FIG. 18.

FIG. 18 illustrates a body and an adapter of a display apparatus according to an embodiment. FIG. 19 illustrates a cross section taken along line D-D' shown in FIG. 18.

As shown in FIGS. 18 and 19, an adapter connector 220 may include a first adapter surface 301, a second adapter surface 302, a third adapter surface 303, and a fourth adapter surface 304, and may be inserted into a connector concave portion 400 of a body 101, which includes a first concave surface 401, a second concave surface 402, a third concave surface 403, and a fourth concave surface 404. A primary coil 221 having an annular shape is provided inside the adapter connector 220, and a secondary coil 231 having an annular shape is provided inside the body 101.

The primary coil 221 having an annular shape is wound around a virtual central axis perpendicular to the fourth adapter surface 304 on a virtual plane parallel to the fourth adapter surface 304. Due to the primary coil 221 having an annular shape, a magnetic field passing through the fourth adapter surface 304 may be generated.

The secondary coil 231 having an annular shape is wound around a virtual central axis perpendicular to the fourth concave surface 404 on a virtual plane parallel to the fourth concave surface 404. The magnetic field vertically passing through the fourth concave surface 404 may pass through a center of the secondary coil 231 having an annular shape.

When the adapter connector 220 is inserted into the connector concave portion 400, the primary coil 221 having an annular shape and the secondary coil 231 having an annular shape may be disposed on both sides of the fourth adapter surface 304 and the fourth concave surface 404, respectively. In addition, as shown in FIG. 19, a center of the primary coil 221 having an annular shape may be aligned with the center of the secondary coil 231 having an annular shape.

A magnetic field generated at a center portion of the primary coil 221 having an annular shape may pass through the fourth adapter surface 304 and the fourth concave surface 404 and pass through a center portion of the secondary coil 231 having an annular shape. As a result, among the magnetic field generated in the center portion of the primary coil 221 having an annular shape, the magnetic field interlinked with the secondary coil 231 having an annular shape increases, and a mutual inductance between the primary coil 221 having an annular shape and the secondary coil 231 having an annular shape may be increased.

Figure 20:
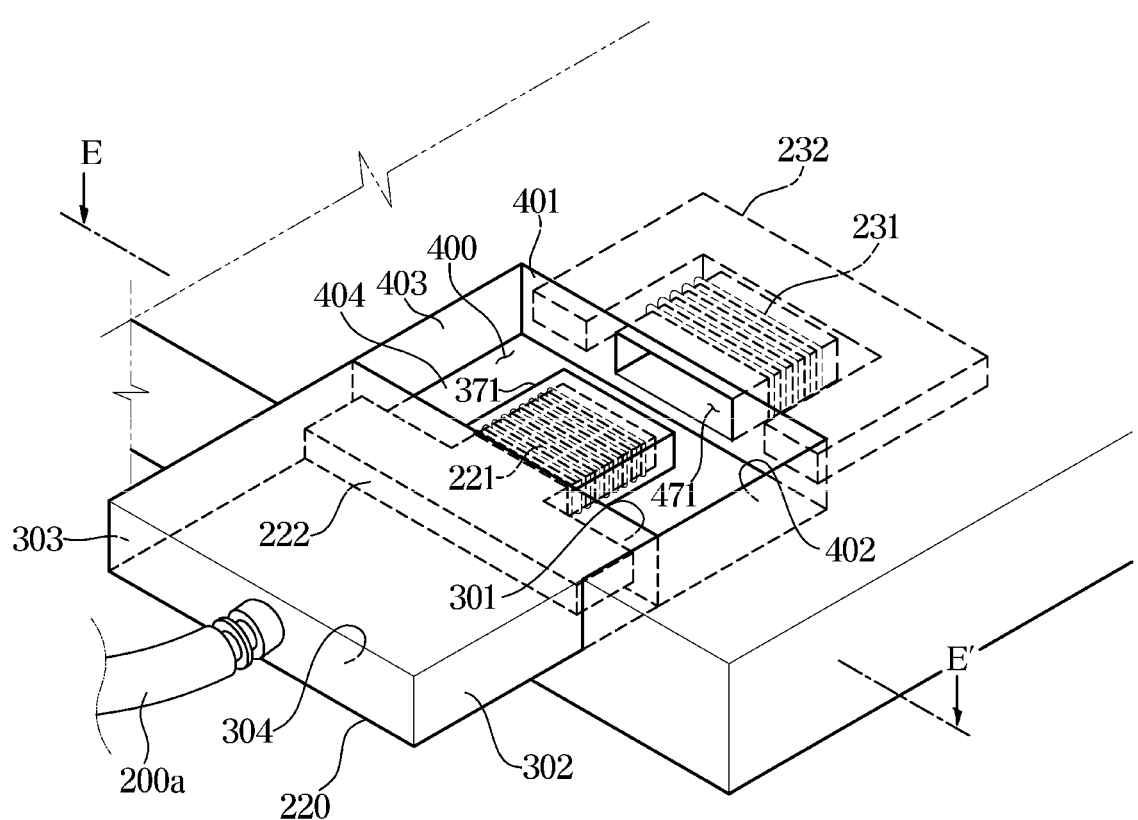
FIG. 20 illustrates a body and an adapter of a display apparatus according to an embodiment.
Figure 21:
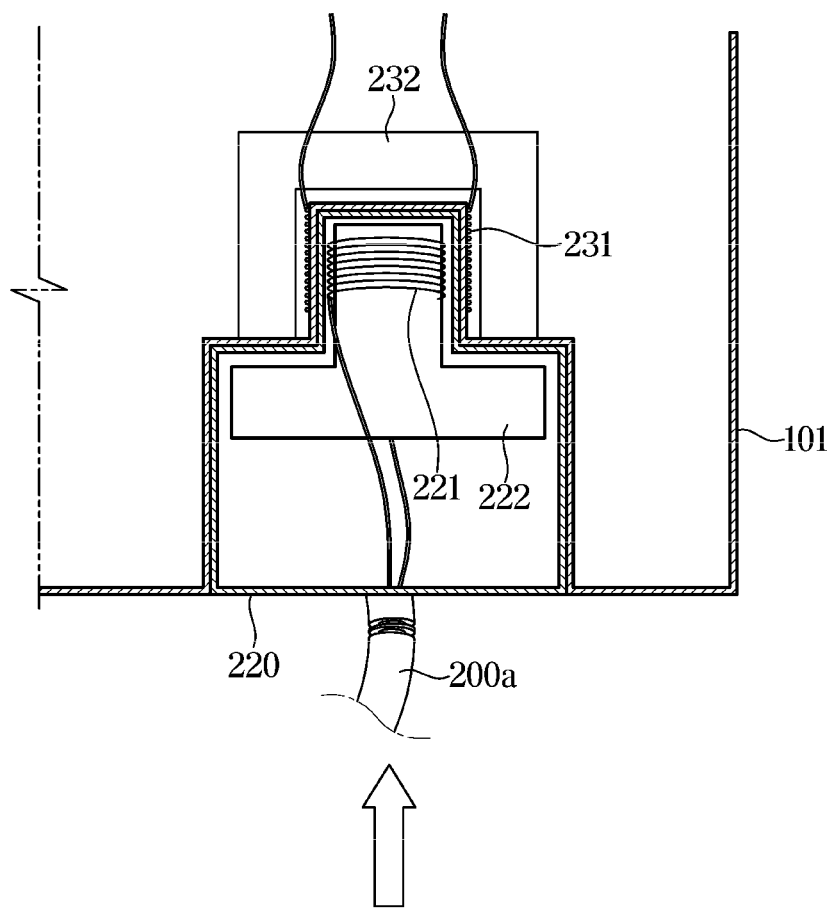
FIG. 21 illustrates a cross section taken along line E-E' shown in FIG. 20.

FIG. 20 illustrates a body and an adapter of a display apparatus according to an embodiment. FIG. 21 illustrates a cross section taken along line E-E' shown in FIG. 20.

As shown in FIGS. 20 and 21, an adapter connector 220 may include a first adapter surface 301, a second adapter surface 302, and a third adapter surface 303, and may be inserted into a connector concave portion 400 of a body 101, which includes a first concave surface 401, a second concave surface 402, and a third concave surface 403. A primary coil 221 and a first magnetic core 222 having an inverted English letter "T" shape are provided inside the adapter connector 220, and a secondary coil 231 and a second magnetic core 232 having an English letter "U" shape are provided inside the body 101.

In order to align the first magnetic core 222 with the second magnetic core 232, an insertion protrusion 371 is provided on the first adapter surface 301 of the adapter connector 220, and an insertion groove 471 is provided in the first concave surface 401 of the connector concave portion 400.

A protruding portion of the first magnetic core 222 having an inverted English letter "T" shape is provided inside the insertion protrusion 371. As shown in FIG. 20, the protruding portion of the first magnetic core 222 is provided inside the insertion protrusion 371 so as to protrude from the first adapter surface 301 toward the first concave surface 401 of the connector concave portion 400.

The primary coil 221 is wound around the protruding portion of the first magnetic core 222. In other words, the primary coil 221 is wound around a central axis in a direction in which the insertion protrusion 371 protrudes. Accordingly, a magnetic field generated by the primary coil 221 may be generated in the direction in which the insertion protrusion 361 protrudes.

In the second magnetic core 232 having an English letter "U" shape, two legs of an English letter "U" may be disposed to face the first concave surface 401 that is a side surface of the connector concave portion 400. In addition, the insertion groove 471 may be disposed between the two legs of the English letter "U."

The secondary coil 231 is wound around a periphery of the insertion groove 471. In other words, the secondary coil 231 is wound around a central axis in a direction in which the insertion protrusion 371 is inserted into the insertion groove 471. Accordingly, when the insertion protrusion 371 is inserted into the insertion groove 471, the magnetic field generated by the primary coil 221 may pass through a center of the secondary coil 231.

The insertion protrusion 371 and the insertion groove 471 may be disposed such that the first magnetic core 222 having an inverted English letter "T" shape is aligned with the second magnetic core 232 having an English letter "U" shape. Accordingly, when the insertion protrusion 371 is inserted into the insertion groove 471, the secondary coil 231 and the primary coil 221 may be disposed such that the secondary coil 231 is wound around the primary coil 221, and the leakage of the magnetic field between the secondary coil 231 and the primary coil 221 may be minimized.

The arrangement of the insertion protrusion 371 and the insertion groove 471 and the shapes of the first magnetic core 222 and the second magnetic core 232 are not limited to those shown in FIGS. 20 and 21. For example, in the adapter connector 220, a magnetic core having an English letter "U" shape may be provided, and an insertion groove may be formed. In addition, in the connector concave portion 400, a magnetic core having an inverted English letter "T" shape may be provided, and an insertion protrusion may be formed.

In the above, it is described that high-voltage power is transmitted from the adapter 200 to the body 101 by a magnetic interaction, and an electrical signal and low-voltage power are transmitted from the adapter 200 to the body 101 by an electrical contact.

However, the transmission of the electrical signal and the low-voltage power is not limited to the electrical contact. For example, the electrical signal and the low-voltage power may also be transmitted from the adapter 200 to the body 101 by the magnetic interaction.

A small-sized primary coil and a small-sized secondary coil may be provided in the adapter connector 220 and the body connector 230, respectively. Low-voltage AC power may be transmitted from the adapter 200 to the body 101 by a magnetic interaction between the small-sized primary coil and the small-sized secondary coil.

In addition, a reader and a tag for near field communication (NFC) may be provided in the adapter connector 220 and the body connector 230. For example, an NFC reader may be provided in the adapter connector 220, and an NFC tag may be provided in the body connector 230. In addition, the NFC reader may be provided in both the adapter connector 220 and the body connector 230.

By transmitting all of the high-voltage power and the low-voltage power and the electrical signal from the adapter 200 to the body 101 by the magnetic interaction as described above, the electric contacts of the adapter connector 220 and the electric contacts of the body connector 230 may be eliminated. Accordingly, a safety accident such as earth leakage or electric shock caused by the electric contacts exposed to the outside may be prevented.

Figure 22:
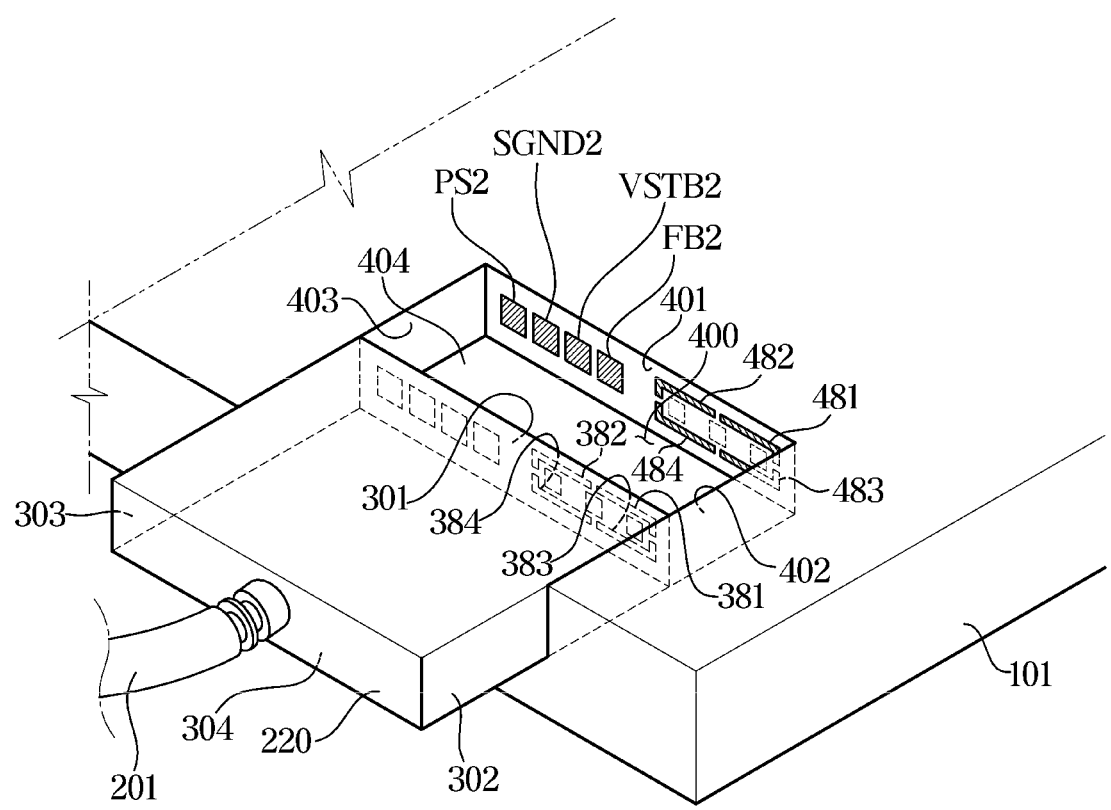
FIG. 22 illustrates a body and an adapter of a display apparatus according to an embodiment.
Figure 23A:
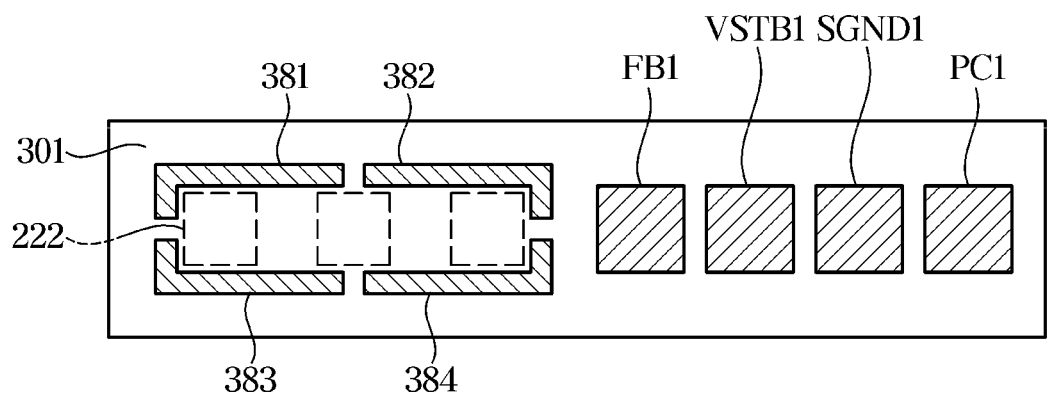
FIGS. 23A and 23B illustrate a first concave surface and a first adapter surface shown in FIG. 22.
Figure 23B:
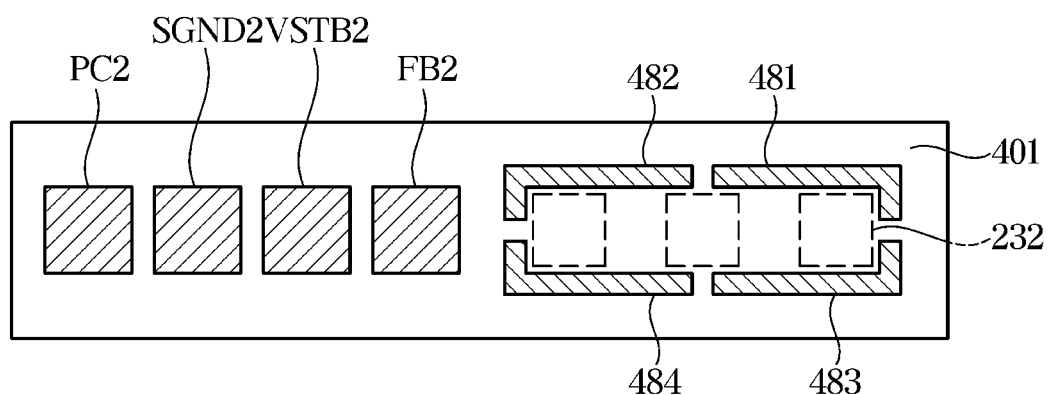

FIG. 22 illustrates a body and an adapter of a display apparatus according to an embodiment. FIGS. 23A and 23B illustrate a first concave surface and a first adapter surface shown in FIG. 22.

As shown in FIG. 22, an adapter connector 220 may include a first adapter surface 301, a second adapter surface 302, a third adapter surface 303, and a fourth adapter surface 304, and may be inserted into a connector concave portion 400 of a body 101, which includes a first concave surface 401, a second concave surface 402, a third concave surface 403, and a fourth concave surface 404. A primary coil 221 and a first magnetic core 222 are provided inside the adapter connector 220, and a secondary coil 231 and a second magnetic core 232 are provided inside the body 101.

In order to identify whether the first magnetic core 222 is aligned with the second magnetic core 232, adapter electrodes 381, 382, 383, and 384 may be provided on the first adapter surface 301 of the adapter connector 220. In addition, body electrodes 481, 482, 483, and 484 may be provided on the first concave surface 401 of the connector concave portion 400.

The adapter electrodes 381, 382, 383, and 384 may be disposed to surround a portion of the first adapter surface 301 corresponding to the first magnetic core 222. For example, as shown in FIG. 23A, a first adapter electrode 381, a second adapter electrode 382, a third adapter electrode 383, and a fourth adapter electrode 384 may be disposed along an outer periphery of the portion corresponding to the first magnetic core 222. The first, second, third, and fourth adapter electrodes 381, 382, 383, and 384 may be respectively disposed near four vertices of the portion corresponding to the first magnetic core 222.

The body electrodes 481, 482, 483, and 484 may be disposed to surround a portion of the first concave surface 401 corresponding to the second magnetic core 232. For example, as shown in FIG. 23B, a first body electrode 481, a second body electrode 482, a third body electrode 483, and a fourth body electrode 484 may be disposed along an outer periphery of the portion corresponding to the second magnetic core 232. The first, second, third, and fourth body electrodes 481, 482, 483, and 484 may be respectively disposed near four vertices of the portion corresponding to the second magnetic core 232.

When the first magnetic core 222 of the adapter connector 220 is aligned with the second magnetic core 232 of the body connector 230, the adapter electrodes 381, 382, 383, and 384 may be electrically connected to the body electrodes 481, 482, 483, and 484, respectively. For example, the first adapter electrode 381 may be electrically connected to the first body electrode 481, the second adapter electrode 382 may be electrically connected to the second body electrode 482, the third adapter electrode 383 may be electrically connected to the third body electrode 483, and the fourth adapter electrode 384 may be electrically connected to the fourth body electrode 484.

On the other hand, when the first magnetic core 222 is not aligned with the second magnetic core 232, at least one of the adapter electrodes 381, 382, 383, and 384 may not be connected to at least one of the body electrodes 481, 482, 483, and 484 corresponding thereto. In addition, when the first magnetic core 222 is not aligned with the second magnetic core 232, at least one of the adapter electrodes 381, 382, 383, and 384 may be connected to the body electrode that does not correspond to the at least one adapter electrode. For example, when the first magnetic core 222 is not aligned with the second magnetic core 232, the first adapter electrode 381 may be electrically connected to the second body electrode 482.

The processor 160 of the body 101 may determine that the first magnetic core 222 is aligned with the second magnetic core 232 on the basis of the fact that the adapter electrodes 381, 382, 383, and 384 are electrically connected to the body electrodes 481, 482, 483, and 484, respectively.

For example, when the first adapter electrode 381 and the fourth adapter electrode 384, which are not adjacent to each other, are electrically connected, the processor 160 may apply a sensing signal to the first body electrode 481 and determine whether the sensing signal is received from the second body electrode 482, the third body electrode 483, and the fourth body electrode 484. When the sensing signal is not received from the second body electrode 482 and the third body electrode 483 and is received only from the fourth body electrode 484, the processor 160 may determine that the first magnetic core 222 is aligned with the second magnetic core 232. When it is determined that the first magnetic core 222 is aligned with the second magnetic core 232, the processor 160 may transmit a "power source on signal" to the adapter 200 through a first body contact PS2 in response to a user input for turning on the power source.

When the sensing signal is received from at least one of the second body electrode 482 and the third body electrode 483 or the sensing signal is not received from the fourth body electrode 484, the processor 160 may determine that the first magnetic core 222 is not aligned with the second magnetic core 232. When it is determined that the first magnetic core 222 is not aligned with the second magnetic core 232, the processor 160 may transmit a "power source off signal" to the adapter 200 through the first body contact PS2 even when the user input for turning on the power source is received. In addition, the processor 160 may control the speaker 142 to output a warning sound.

Figure 24:
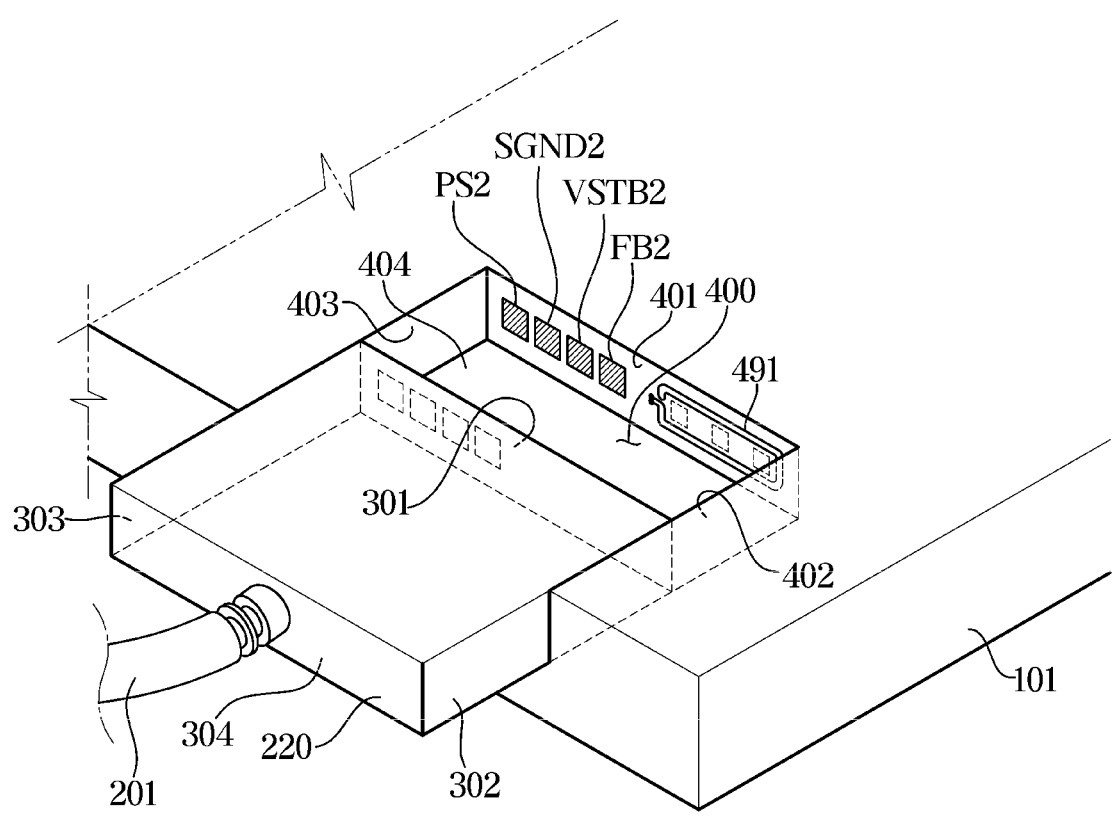
FIG. 24 illustrates a body and an adapter of a display apparatus according to an embodiment.
Figure 25:
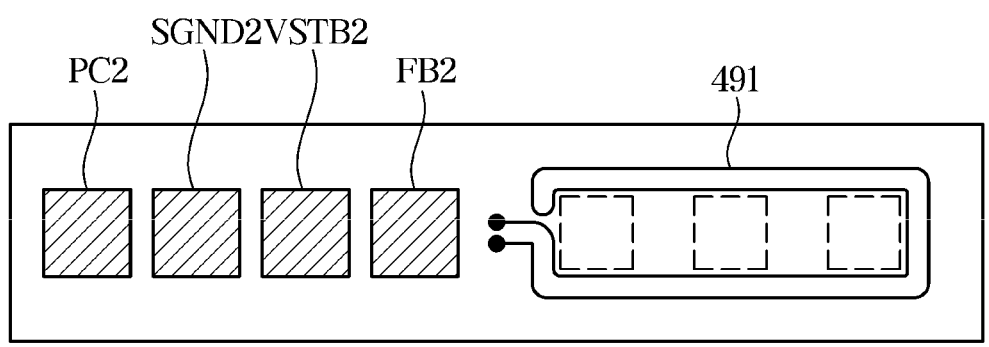
FIG. 25 illustrates a first concave surface shown in FIG. 24.

FIG. 24 illustrates a body and an adapter of a display apparatus according to an embodiment. FIG. 25 illustrates a first concave surface shown in FIG. 24.

As shown in FIG. 24, an adapter connector 220 may include a first adapter surface 301, a second adapter surface 302, a third adapter surface 303, and a fourth adapter surface 304, and may be inserted into a connector concave portion 400 of a body 101, which includes a first concave surface 401, a second concave surface 402, a third concave surface 403, and a fourth concave surface 404. A primary coil 221 and a first magnetic core 222 are provided inside the adapter connector 220, and a secondary coil 231 and a second magnetic core 232 are provided inside the body 101.

In order to identify whether the first magnetic core 222 is aligned with the second magnetic core 232, a closed loop 491 may be provided on the first concave surface 401 of the connector concave portion 400.

The closed loop 491 may be disposed to surround a portion of the first concave surface 401 corresponding to the second magnetic core 232. For example, as shown in FIG. 25, a surface 491a formed by the closed loop 491 may be disposed to surround the portion of the first concave surface 401 corresponding to the second magnetic core 232.

The closed loop 491 may be connected to the processor 160 through a resistive load and a rectifying circuit. A magnetic field leaking around the second magnetic core 232 may pass through the closed surface 491a due to the closed loop 491, and a current may be induced in the closed loop 491 due to the leaked magnetic field. The induced current may be rectified by the resistive load and the rectifying circuit, and a voltage signal by the induced current may be applied to the processor 160. On the basis of the voltage signal by the induced current of the closed loop 491, the processor 160 may identify whether the first magnetic core 222 of the adapter connector 220 is aligned with the second magnetic core 232 of the body connector 230.

When the first magnetic core 222 is aligned with the second magnetic core 232, most of a magnetic field generated in the first magnetic core 222 by the primary coil 221 may be transmitted to the second magnetic core 232. Accordingly, the magnitude of the magnetic field leaking around the second magnetic core 232 is reduced, and the magnitude of the current induced by the closed loop 491 is reduced. Accordingly, the magnitude of the voltage signal applied to the processor 160 may be reduced. When the magnitude of the voltage signal is less than a reference voltage, the processor 160 may determine that the first magnetic core 222 is aligned with the second magnetic core 232. When it is determined that the first magnetic core 222 is aligned with the second magnetic core 232, the processor 160 may transmit a "power source on signal" to the adapter 200 through a first body contact PS2 in response to a user input for turning on the power source.

When the first magnetic core 222 is not aligned with the second magnetic core 232, a large portion of the magnetic field generated in the first magnetic core 222 by the primary coil 221 may be leaked. Thus, the magnitude of the magnetic field leaking around the second magnetic core 232 is increased, and the magnitude of the current induced by the closed loop 491 is increased. Accordingly, the magnitude of the voltage signal applied to the processor 160 may be increased. When the magnitude of the voltage signal is greater than or equal to the reference voltage, the processor 160 may determine that the first magnetic core 222 is not aligned with the second magnetic core 232. When it is determined that the first magnetic core 222 is not aligned with the second magnetic core 232, the processor 160 may transmit a "power source off signal" to the adapter 200 through the first body contact PS2 even when the user input for turning on the power source is received. In addition, the processor 160 may control the speaker 142 to output a warning sound.

Figure 26:
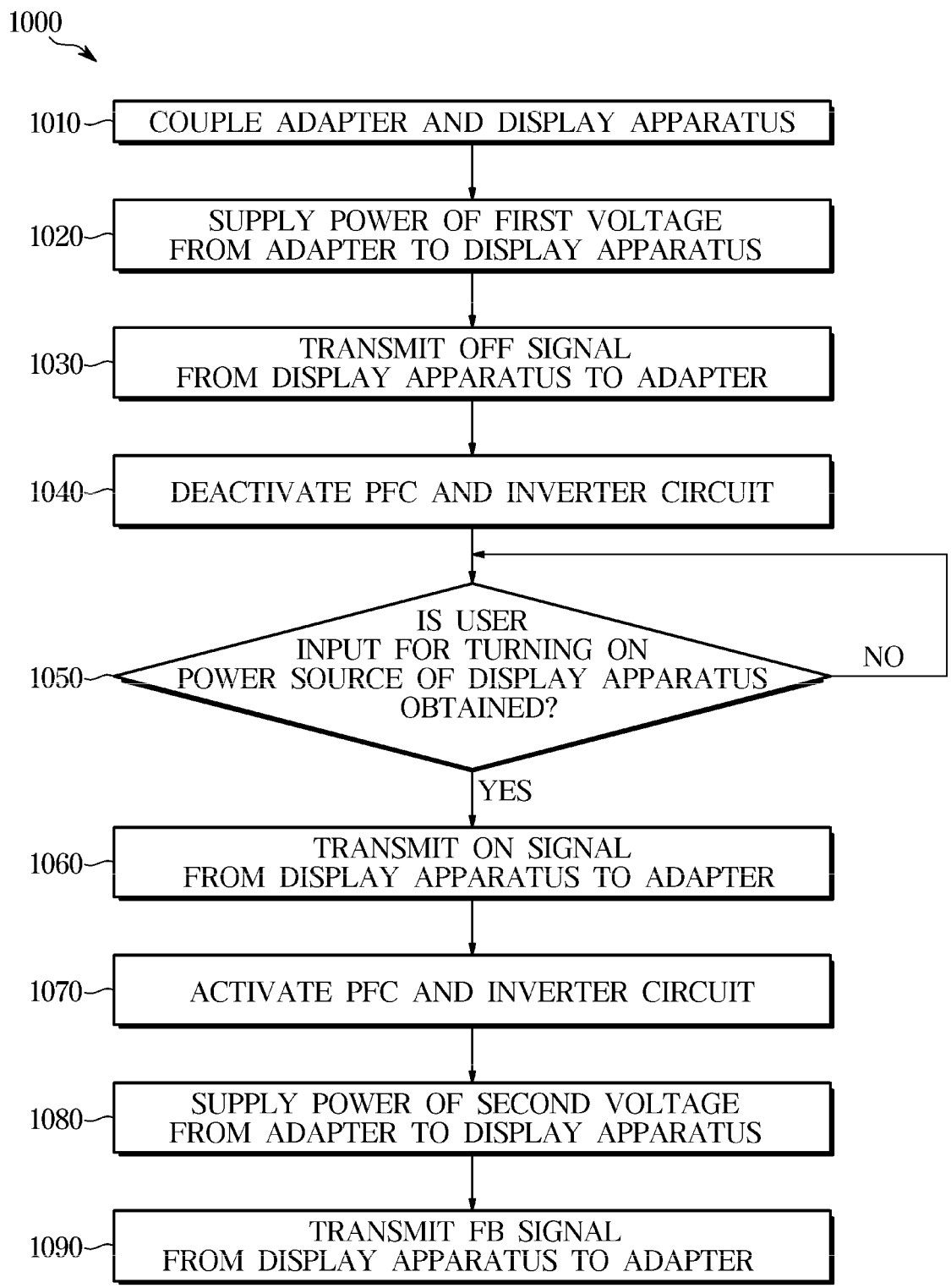
FIG. 26 illustrates a power supply operation of the power supply included in the display apparatus according to an embodiment.

FIG. 26 illustrates a power supply operation of the power supply included in the display apparatus according to an embodiment.

A power supply operation 1000 of the display apparatus 100 will be described with reference to FIG. 26.

The display apparatus 100 is coupled to the adapter 200 (1010).

A user may insert the adapter connector 220 of the adapter 200 into the connector concave portion 400 of the body 101 to supply power to the display apparatus 100.

The plurality of electric contacts PS1, SGND1, VSTB1, and FB1 of the adapter connector 220 may be brought into contact with the plurality of electric contacts PS2, SGND2, VSTB2, and FB2 of the body connector 230, respectively. In addition, the first magnetic core 222 of the adapter connector 220 may be aligned with the second magnetic core 232 of the body connector 230.

The display apparatus 100 receives power of a first voltage from the adapter 200 (1020).

The user may insert the plug of the adapter 200 into a household electrical socket.

When the plug of the adapter 200 is inserted into the power socket, external AC power is supplied to the adapter 200. The adapter 200 may rectify the external AC power and convert a voltage of the rectified power. Since the power is not supplied to the PFC controller 213a and the inverter controller 215a, the PFC 213 and the inverter 215 may be deactivated. The external AC power is converted into to DC power of the first voltage by the EMI filter 211, the first rectifier 212, the DC-DC converter 216, and the third DC link capacitor 217.

The adapter 200 may provide the DC power of the first voltage to the body 101 through the plurality of electric contacts PS1, SGND1, VSTB1, and FB1.

By the DC power of the first voltage, power is supplied to the processor 160 of the display apparatus 100, and the processor 160 may be activated. However, the power may not be supplied to the display 150. In other words, the display apparatus 100 may operate in a "standby state" due to the DC power of the first voltage.

The display apparatus 100 provides a "power source off signal" to the adapter 200 (1030).

The processor 160 may transmit the "power source off signal" to the adapter 200 through the first body contact PS2 on the basis of the fact that a user input for turning on the display apparatus 100 is not received.

The PFC 213 and the inverter 215 of the adapter 200 are deactivated (1040).

In response to receiving the "power source off signal," the switch circuit 218 may be turned off, and the power supply to the PFC controller 213a and the inverter controller 215a may be blocked. Accordingly, the PFC 213 and the inverter 215 may be deactivated.

The display apparatus 100 determines whether a user input for turning on a power source is obtained (1050).

The user input unit 110 may obtain the user input for turning on the power source from the user and may provide an electrical signal corresponding to the user input to the processor 160.

The processor 160 may determine whether the user input for turning on the power source is obtained on the basis of an output signal of the user input unit 110.

When it is determined that the user input for turning on the power source is not obtained (NO in operation 1050), the display apparatus 100 may maintain the "standby state."

When it is determined that the user input for turning on the power source is obtained (YES in operation 1050), the display apparatus 100 provides a "power source on signal" (1060).

The processor 160 may transmit the "power source on signal" to the adapter 200 through the first body contact PS2 on the basis of the received user input for turning on the display apparatus 100.

The PFC 213 and the inverter 215 of the adapter 200 are activated (1070).

In response to receiving the "power source on signal," the switch circuit 218 may be turned on, and the power is supplied to the PFC controller 213a and the inverter controller 215a from the DC-DC converter 216. The PFC controller 213a may output a signal for repeating the turn-on and turn-off of the switch Q1. Further, the inverter controller 215a may output a signal for alternately turning on/off the switches Q2 and Q3. Accordingly, the PFC 213 and the inverter 215 may be activated.

The display apparatus 100 receives power of a second voltage from the adapter 200 (1080).

After the PFC 213 and the inverter 215 are activated, the external AC power is converted into AC power by the EMI filter 211, the first rectifier 212, the PFC 213, and the inverter 215. The AC power of the inverter 215 is transmitted to the second rectifier 241 by a magnetic interaction between the primary coil 221 of the adapter 200 and the secondary coil 231 of the body 101. The second rectifier 241 and the second DC link capacitor 242 may supply DC power of the second voltage to the display apparatus 100.

The DC power of the second voltage is supplied to both the processor 160 and the display 150, and the display apparatus 100 is switched to an "on state,"

The display apparatus 100 provides a feedback signal FB to the adapter 200 (1090).

The second power circuit 132 installed in the display apparatus 100 may transmit the feedback signal FB to the adapter 200 through the fourth body contact FB2.

After receiving the feedback signal FB, the inverter controller 215a may control the switches Q2 and Q3 to continue to convert the DC power of the first DC link capacitor 214 into AC power.

By the power supply operation 1000 shown in FIG. 26, the adapter 200 may supply standby power of the first voltage to the body 101 in the "standby state" in which the display apparatus 100 is powered off. In addition, the adapter 200 may supply activated power of the second voltage to the body 101 in the "on state" in which the display apparatus 100 is powered on. Accordingly, unnecessary power consumption in the "standby state" of the display apparatus 100 is prevented.

Figure 27:
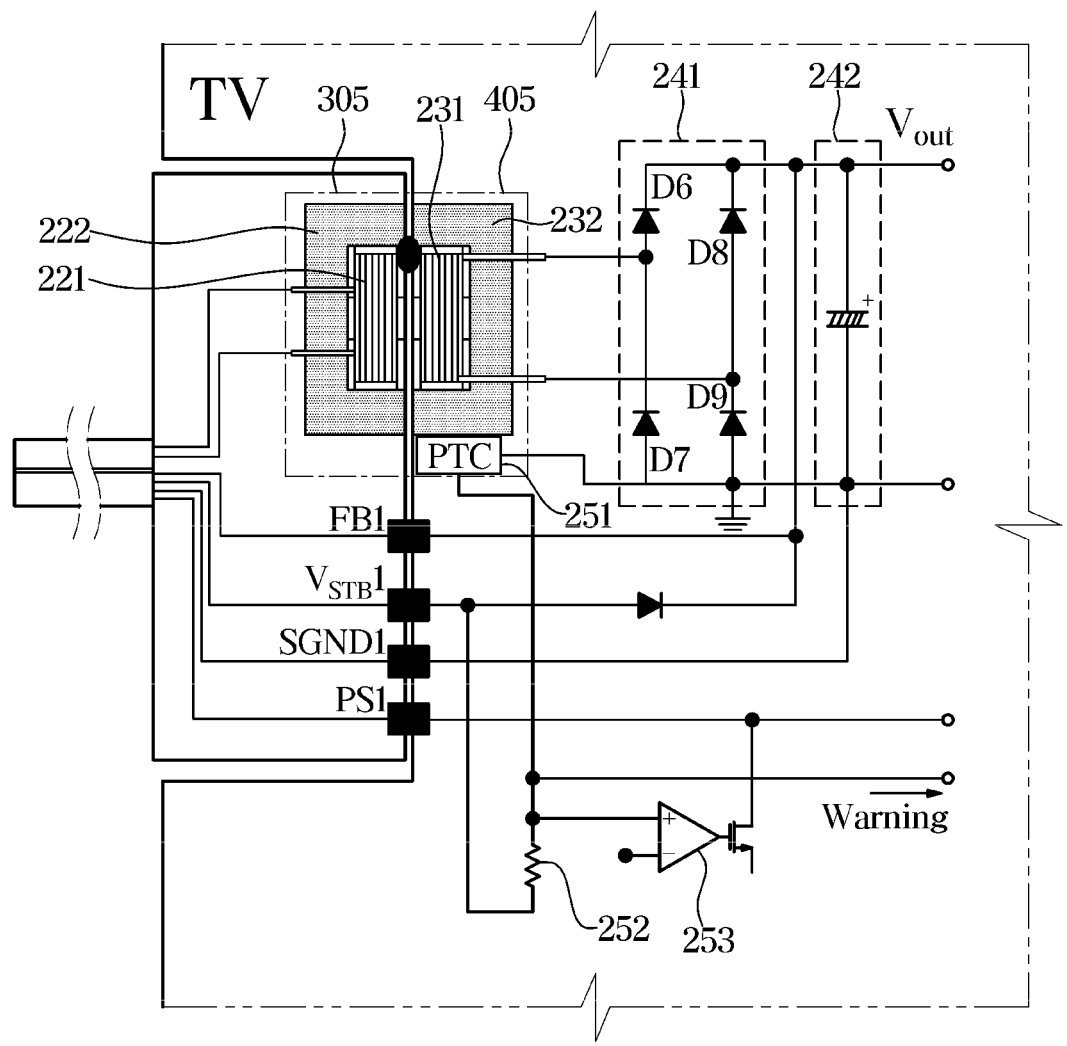
FIG. 27 illustrates a circuit for preventing overheating of the power supply included in the display apparatus according to an embodiment.

FIG. 27 illustrates a circuit for preventing overheating of a power supply included in the display apparatus according to an embodiment.

As shown in FIG. 27, an adapter connector 220 includes a primary coil 221 and a first magnetic core 222, and a body connector 230 includes a secondary coil 231 and a second magnetic core 232. AC power may be supplied to the primary coil 221, and transmitted to the secondary coil 231 through the first magnetic core 222 and the second magnetic core 232.

In order to block (absorb) a magnetic field leaking from an air gap between the first magnetic core 222 and the second magnetic core 232 during the transmission of the AC power, a first metal structure 305 is disposed around the primary coil 221 and the first magnetic core 222, and a second metal structure 405 is disposed around the secondary coil 231 and the second magnetic core 232.

When there is a foreign material between the adapter connector 220 and the body connector 230, the first magnetic core 222 is not aligned with the second magnetic core 232. As a result, the intensity of the magnetic field leaking from the air gap between the first magnetic core 222 and the second magnetic core 232 is increased.

Accordingly, an eddy current may be induced in the first and second metal structures 305 and 405 due to the leaked magnetic field. In addition, due to the eddy current, Joule's heat may be generated, and the first and second metal structures 305 and 405 may be heated.

As such, a temperature of each of the first and second metal structures 305 and 405 may be an indicator indicating whether the first magnetic core 222 is aligned with the second magnetic core 232 and whether there is a foreign material between the adapter connector 220 and the body connector 230.

Accordingly, the display apparatus 100 may further include a temperature sensor for measuring the second metal structure 405 of the body connector 230. For example, the display apparatus 100 further includes a thermistor 251 that is in contact with the second metal structure 405 or provided near the second metal structure 405, as shown in FIG. 27.

The thermistor 251 may be a positive temperature coefficient (PTC) thermistor whose electrical resistance increases as the temperature rises. One end of the thermistor 251 is connected to the ground, and the other end of the thermistor 251 may be connected to a resistor 252 that is connected to a third body contact VSTB2 through which low-voltage power is supplied. A node to which the thermistor 251 and the resistor 252 are connected may be connected to a positive terminal of a comparator 253. A voltage of a predetermined magnitude may be input to a negative terminal of the comparator 253, and an output of the comparator 253 is connected to a terminal of a switch Q4. The comparator 253 may include an operation amplifier (OPAMP).

The switch Q4 may be provided between the ground and a first body contact PS2 through which a power-on signal or a power-off signal is output.

Further, the node to which the thermistor 251 and the resistor 252 are connected may be connected to the processor 160, and a signal related to the temperature of the second metal structure 405 may be input to the processor 160.

When the first magnetic core 222 is not aligned with the second magnetic core 232 or a foreign material is located between the adapter connector 220 and the body connector 230, a temperature of the thermistor 251 may be increased. Due to the temperature rise, an electrical resistance value of the thermistor 251 increases, and the voltage that is input to the positive terminal of the comparator 253 is increased. Due to the temperature rise, when the voltage input to the positive terminal of the comparator 253 is greater than a reference voltage input to the negative terminal of the comparator 253, the comparator 253 outputs an "ON" signal, and the switch Q4 is turned on. The first body contact PS2 may be electrically connected to the ground, and a "power source off signal" may be transmitted to the adapter through the first body contact PS2.

Due to the "power source off signal," a PFC 213 and an inverter 215 are deactivated, and the transmission of high-voltage power is stopped.

As such, when the first magnetic core 222 is not aligned with the second magnetic core 232 or a foreign material is located between the adapter connector 220 and the body connector 230, the supply of the high-voltage power to the display apparatus 100 may be cut off. Accordingly, the efficiency of the power transmission from the adapter 200 to the body 101 may be improved, and a safety accident due to overheating between the adapter connector 220 and the body connector 230 may be prevented.

However, the present disclosure is not limited thereto, and the thermistor may be in contact with the first metal structure 305 of the adapter connector 220 or provided near the first metal structure 305, and may detect the temperature of the first metal structure 305. In addition, a circuit for deactivating the PFC 213 and the inverter 215 when the temperature of the first metal structure 305 exceeds a reference temperature may be provided in the adapter 200.

Figure 28:
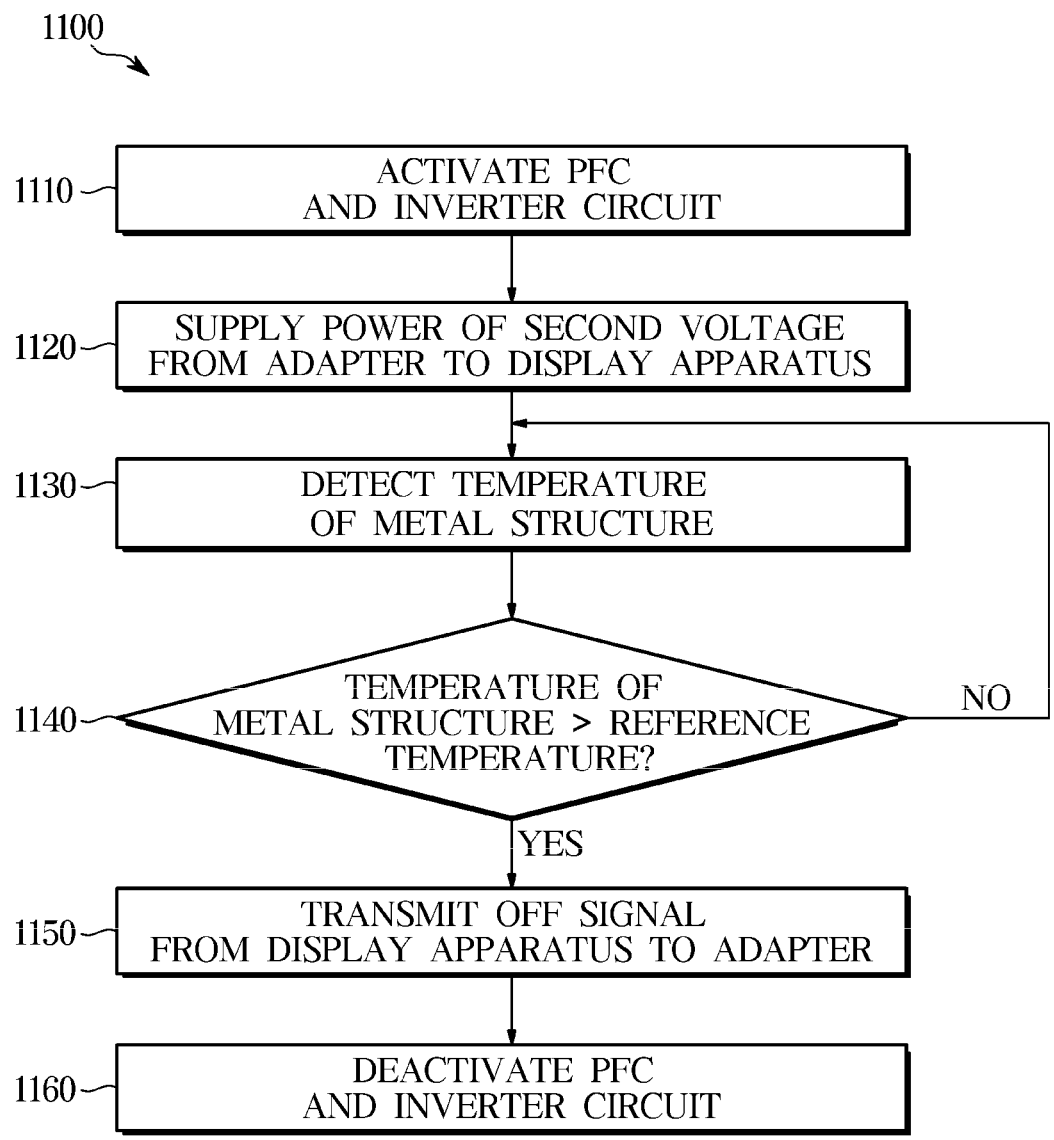
FIG. 28 illustrates an overheating prevention operation of the power supply included in the display apparatus according to an embodiment.

FIG. 28 illustrates an overheating prevention operation of the power supply included in the display apparatus according to an embodiment.

An overheating prevention operation 1100 of the power supply 130 will be described with reference to FIG. 28.

The PFC 213 and the inverter 215 of the adapter 200 are activated (1110).

In response to a user input for turning on a power source of the display apparatus 100, the processor 160 may transmit a "power source on signal" to the adapter 200 through the first body contact PS2. In response to the "power source on signal," the PFC 213 and the inverter 215 of the adapter 200 may be activated.

The display apparatus 100 receives power of a second voltage from the adapter 200 (1120).

Operation 1120 may be the same as operation 1080 shown in FIG. 26.

The display apparatus 100 detects a temperature of the second metal structure 405 (1130).

The display apparatus 100 includes the thermistor 251 that is in contact with the second metal structure 405 or provided near the second metal structure 405. The thermistor 251 may provide a signal related to the temperature of the second metal structure 405 to the processor 160.

The display apparatus 100 determines whether the temperature of the second metal structure 405 exceeds a reference temperature (1140).

On the basis of an output signal of the thermistor 251, the processor 160 may identify whether the temperature of the second metal structure 405 exceeds the reference temperature. For example, the processor 160 may compare a voltage of the output signal of the thermistor 251 with a reference voltage, and may identify whether the temperature of the second metal structure 405 exceeds the reference temperature on the basis of whether the voltage of the output signal of the thermistor 251 is greater than the reference voltage.

When the temperature of the second metal structure 405 does not exceed the reference temperature (NO in operation 1140), the display apparatus 100 may continue to measure the temperature of the second metal structure 405.

When the temperature of the second metal structure 405 exceeds the reference temperature (YES in operation 1140), the display apparatus 100 provides a "power source off signal" to the adapter 200 (1150).

Operation 1150 may be the same as operation 1030 of FIG. 26.

The PFC 213 and the inverter 215 of the adapter 200 are deactivated (1160).

Operation 1160 may be the same as operation 1040 of FIG. 26.

As such, when the first magnetic core 222 is not aligned with the second magnetic core 232 or a foreign material is located between the adapter connector 220 and the body connector 230, the display apparatus 100 may control the adapter 200 to cut off the supply of high-voltage power. Accordingly, the efficiency of the power transmission from the adapter 200 to the body 101 may be improved, and a safety accident due to overheating between the adapter connector 220 and the body connector 230 may be prevented.

A display apparatus according to an embodiment includes a body, a display provided in the body, a processor provided in the body and configured to control the display to display an image, and a power supply including an adapter detachable from the body and a power assembly configured to supply power to at least one of the display and the processor, wherein the power assembly may receive the power from the adapter in a non-contact manner.

As such, since a power circuit, which is large in volume, is installed in the adapter provided separately from the body, a thickness of the body of the display apparatus may be reduced. In addition, since the adapter supplies the power to the body in a non-contact manner or a wireless manner, a contact terminal for high-voltage power transmission is not exposed to the outside, and an accident due to the externally exposed contact terminal is prevented.

The power supply may include a transformer, wherein the transformer may include a first magnetic core disposed in the adapter, a primary coil wound around the first magnetic core, a second magnetic core disposed in the body, and a secondary coil wound around the second magnetic core, wherein the primary coil and the first magnetic core may be magnetically associated with the secondary coil and the second magnetic core without being in contact with the second magnetic core.

By using the magnetic core in transmitting power in a non-contact manner or a wireless manner, the efficiency of power transmission may be improved. Further, by separating the magnetic core for power transmission into an adapter-side core and a body-side core, the efficiency of power transmission between the magnetic cores is improved.

The adapter may include an adapter connector in which the first magnetic core and the primary coil are disposed, the body may include a body connector in which the second magnetic core and the secondary coil are disposed and a connector concave portion into which the adapter connector may be inserted, and when the adapter connector is inserted into the connector concave portion, the first magnetic core may be disposed to be aligned with the second magnetic core.

As the adapter-side core and the body-side core are aligned with each other, a transmission efficiency of the power transmitted from the adapter to the body is improved.

A guide protrusion extending in a direction, in which the adapter connector is inserted into the connector concave portion, and configured to guide the adapter connector to be inserted into the connector concave portion may be provided in the adapter connector, and a guide groove extending in the direction, in which the adapter connector is inserted into the connector concave portion, and configured to guide the adapter connector to be inserted into the connector concave portion may be provided in the connector concave portion.

Since the guide protrusion and the guide groove are provided to guide the coupling between the adapter-side core and the body-side core, the alignment of the adapter-side core and the body-side core is ensured when the adapter is coupled to the body.

A first magnet may be provided on a first surface of the adapter connector, at which the first magnetic core is aligned with the second magnetic core, and a second magnet may be provided on a second surface of the connector concave portion, at which the second magnetic core is aligned with the first magnetic core.

Since the first and second magnets are provided to guide the coupling between the adapter-side core and the body-side core, the alignment of the adapter-side core and the body-side core is ensured when the adapter is coupled to the body.

An insertion protrusion in which at least a portion of the first magnetic core is disposed and which protrudes in a direction in which the adapter connector is inserted into the connector concave portion, may be provided in the adapter connector, and an insertion groove recessed in the direction in which the adapter connector is inserted into the connector concave portion, and which has a recessed end in which at least a portion of the second magnetic core is disposed may be provided in the connector concave portion.

Since the insertion protrusion and the insertion groove are provided to guide the coupling between the adapter-side core and the body-side core, the alignment of the adapter-side core and the body-side core is ensured when the adapter is coupled to the body.

The body connector may further include a metal structure configured to block a magnetic field leaking between the first magnetic core and the second magnetic core.

Due to the metal structure, a leakage magnetic field that may be generated between the adapter-side core and the body-side core may be blocked, thereby preventing the malfunction of the display apparatus or the deterioration of the display panel caused by the leakage magnetic field.

The first magnetic core may have an English letter "E" shape, the second magnetic core may have an English letter "E" shape, and the first magnetic core and the second magnetic core may be disposed such that three legs of the first magnetic core are aligned with three legs of the second magnetic core when the adapter connector is inserted into the connector concave portion.

Due to the core having an English letter "E," the adapter-side core and the body-side core are easily aligned when the adapter is coupled to the body, and the efficiency of power transmission between the magnetic cores is improved.

The first magnetic core may have an English letter "I" shape, the second magnetic core may have an English letter "U" shape, and the first magnetic core and the second magnetic core may be disposed such that the first magnetic core is inserted between two legs of the second magnetic core when the adapter connector is inserted into the connector concave portion.

Since one core is inserted into another core, the adapter-side core and the body-side core are easily aligned when the adapter is coupled to the body, and the efficiency of power transmission between the magnetic cores is improved.

The adapter may include an adapter connector including a primary coil having an annular shape, the power assembly may include a body connector including a secondary coil having an annular shape and a connector concave portion corresponding to the adapter connector, the first magnetic core may have an annular shape, the second magnetic core may have an annular shape, and a center of the primary coil having an annular shape may be located on the same central axis as a center of the secondary coil having an annular shape when the adapter connector is inserted into the connector concave portion.

Since the center of the primary coil and the center of the secondary coil are located on the same axis, the efficiency of power transmission between the magnetic cores may be improved, and a thickness of each of the adapter and the body may be reduced.

The first magnetic core may have an English letter "T" shape, the second magnetic core may have an English letter "U" shape, and the first magnetic core and the second magnetic core may be disposed such that one leg of the first magnetic core is inserted between two legs of the second magnetic core when the adapter connector is inserted into the connector concave portion.

Since one core is inserted into another core, the adapter-side core and the body-side core are easily aligned when the adapter is coupled to the body, and the efficiency of power transmission between the magnetic cores is improved.

The adapter connector may include a plurality of first electrodes disposed along an outer periphery of the first magnetic core, the body connector may include a plurality of second electrodes disposed along an outer periphery of the second magnetic core, and the plurality of first electrodes may be provided to be in contact with the plurality of second electrodes, respectively, when the adapter connector is inserted into the connector concave portion. The processor may identify whether the first magnetic core is aligned with the second magnetic core on the basis of whether the plurality of first electrodes are in contact with the plurality of second electrodes, respectively.

The display apparatus may identify whether the adapter-side core is aligned with the body-side core when the adapter is coupled to the body on the basis of whether electrodes disposed around each of the adapter-side core and the body-side core are in electrical contact with each other, and accordingly, when the adapter is coupled to the body, the alignment of the adapter-side core and the body-side core is ensured.

The body connector may include a closed loop disposed along an outer periphery of the second magnetic core. The processor may identify whether the first magnetic core is aligned with the second magnetic core on the basis of a current induced in the closed loop.

By measuring a leakage magnetic field using the closed loop provided around the adapter-side core or body-side core, the display apparatus may identify whether the adapter-side core and the body-side core are aligned when the adapter is coupled to the body, and accordingly, when the adapter is coupled to the body, the alignment of the adapter-side core and the body-side core is ensured.

Further, the disclosed embodiments may be implemented in the form of a recording medium storing commands executable by a computer. The commands may be stored in the form of program codes and, when executed by a processor, may generate a program module to perform the operations of the disclosed embodiments. The recording medium may be implemented as a computer-readable recording medium.

The computer-readable recording medium includes all kinds of recording media storing instructions which are decipherable by a computer. For example, there may be a read-only memory (ROM), a random access memory (RAM), a magnetic tape, a magnetic disk, a flash memory, an optical data storage device, and the like.

The computer-readable storage medium may be provided in the form of a non-transitory storage medium. Here, the term 'non-transitory' storage medium may mean that the storage medium is a tangible device that does not include a signal (e.g., electromagnetic waves) without distinguishing between storing data in the storage medium semi-permanently and temporarily. For example, the non-transitory storage medium may include a buffer that temporarily stores data.

The method according to one or more embodiments of the disclosure may be included and provided in a computer program product. The computer program product may be a commercial product that may be traded between a seller and a buyer. The computer program product may be distributed in the form of a storage medium (e.g., a compact disc read-only memory (CD-ROM)), through an application store (e.g., Play Store™), directly between two user devices (e.g., smart phones), or online (e.g., downloaded or uploaded). In the case of online distribution, at least a portion of the computer program product (e.g., a downloadable app) may be at least temporarily stored or arbitrarily created in a storage medium that may be readable to a device, such as a server of the manufacturer, a server of the application store, or a relay server.

According to one or more embodiments, it is possible to provide a display apparatus that receives power from an adapter that is separable from the display apparatus. Accordingly, a capacitor and/or an inductor for supplying the power can be installed in the adapter separated from the display apparatus, and a thickness of the display apparatus can be reduced.

Further, according to one or more embodiments, it is possible to provide a display apparatus that receives high-voltage power from an adapter through a magnetic interaction between the adapter and the display apparatus, and receives low-voltage power from the adapter through an electrical connection between the adapter and the display apparatus. Accordingly, it is possible to prevent a safety accident that may occur when an electrical terminal through which high-voltage power is transmitted from the adapter to the display apparatus is exposed to the outside.

Although embodiments have been described with reference to the accompanying drawings, it will be appreciated by those skilled in the art to which the disclosure pertain that other forms different from the disclosed embodiments can be implemented without departing from the technical spirit and essential features. The disclosed embodiments are illustrative and should not be construed as limitative.

What is claimed is:

1. A display apparatus comprising:
a body;
a display provided in the body;
a processor provided in the body and configured to control the display to display an image;
a power supply comprising an adapter configured to be detachable from the body, and a power assembly configured to receive power from the adapter in a non-contact manner and supply the power to at least one of the display and the processor;
a first magnetic core disposed in the adapter;
a second magnetic core disposed in the body,
wherein the first magnetic core has an "E" shape,
wherein the second magnetic core has an "E" shape, wherein the adapter comprises an adapter connector in which the first magnetic core is disposed, wherein the body comprises a body connector in which the second magnetic core is disposed and a connector concave portion into which the adapter connector is insertable, wherein the adapter connector comprises an insertion protrusion which protrudes in a direction in which the adapter connector is inserted into the connector concave portion and in which at least a portion of three legs of the first magnetic core is disposed, and wherein the connector concave portion comprises an insertion groove recessed in the direction in which the adapter connector is inserted into the connector concave portion and which has a recessed end in which at least a portion of the second magnetic core is disposed.

2. The display apparatus of claim 1, wherein the power supply further comprises a transformer comprising:
a primary coil wound around the first magnetic core;
a secondary coil wound around the second magnetic core, and
wherein the primary coil and the first magnetic core are magnetically associated with the secondary coil and the second magnetic core without being in contact with the second magnetic core.

3. The display apparatus of claim 2,
wherein, when the adapter connector is inserted into the connector concave portion, the first magnetic core is aligned with the second magnetic core.

4. The display apparatus of claim 3, wherein the adapter connector comprises a guide protrusion extending in a direction in which the adapter connector is inserted into the connector concave portion, and configured to guide the adapter connector to be inserted into the connector concave portion, and
wherein the connector concave portion comprises a guide groove extending in the direction in which the adapter connector is inserted into the connector concave portion, and configured to guide the adapter connector to be inserted into the connector concave portion.

5. The display apparatus of claim 3, wherein the adapter connector comprises a first magnet provided on a first surface of the adapter connector at which the first magnetic core is aligned with the second magnetic core, and
wherein the connector concave portion comprises a second magnet provided on a second surface of the connector concave portion at which the second magnetic core is aligned with the first magnetic core.

6. The display apparatus of claim 3, wherein the body connector comprises a metal structure configured to block a magnetic field leaking between the first magnetic core and the second magnetic core.

7. The display apparatus of claim 3, wherein the first magnetic core and the second magnetic core are disposed such that the three legs of the first magnetic core are aligned with three legs of the second magnetic core when the adapter connector is inserted into the connector concave portion.

8. The display apparatus of claim 3, wherein the first magnetic core has an "I" shape,
wherein the second magnetic core has a "U" shape, and
wherein the first magnetic core and the second magnetic core are disposed such that the first magnetic core is inserted between two legs of the second magnetic core when the adapter connector is inserted into the connector concave portion.

9. The display apparatus of claim 2, wherein the adapter connector comprises a primary coil having an annular shape,
wherein the power assembly comprises the body connector comprising a secondary coil having an annular shape and the connector concave portion corresponding to the adapter connector,
wherein the first magnetic core has an annular shape,
wherein the second magnetic core has an annular shape, and
wherein a center of the primary coil having an annular shape is located on a same central axis as a center of the secondary coil having an annular shape when the adapter connector is inserted into the connector concave portion.

10. The display apparatus of claim 3, wherein the first magnetic core has a "T" shape,
wherein the second magnetic core has a "U" shape, and
wherein the first magnetic core and the second magnetic core are disposed such that one leg of the first magnetic core is inserted between two legs of the second magnetic core when the adapter connector is inserted into the connector concave portion.

11. The display apparatus of claim 3, wherein the adapter connector comprises a plurality of first electrodes disposed along an outer periphery of the first magnetic core,
wherein the body connector comprises a plurality of second electrodes disposed along an outer periphery of the second magnetic core, and
wherein the plurality of first electrodes are in contact with the plurality of second electrodes, when the adapter connector is inserted into the connector concave portion.

12. The display apparatus of claim 11, wherein the processor is further configured to identify whether the first magnetic core is aligned with the second magnetic core based on whether the plurality of first electrodes are in contact with the plurality of second electrodes.

13. The display apparatus of claim 3, wherein the body connector comprises a closed loop disposed along an outer periphery of the second magnetic core.

14. The display apparatus of claim 13, wherein the processor is further configured to identify whether the first magnetic core is aligned with the second magnetic core based on a current induced in the closed loop.

* * * * *